United States Patent
Teranishi et al.

(10) Patent No.: US 7,999,968 B2
(45) Date of Patent: Aug. 16, 2011

(54) APPARATUS, METHOD AND COMPUTER PROGRAM PRODUCT FOR PROCESSING DOCUMENT IMAGES OF VARIOUS SIZES AND ORIENTATIONS

(75) Inventors: Tomohiko Teranishi, Kawasaki (JP); Kazuhito Oosumi, Machida (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 0 days.

(21) Appl. No.: 12/874,549

(22) Filed: Sep. 2, 2010

(65) Prior Publication Data

US 2011/0019235 A1 Jan. 27, 2011

Related U.S. Application Data

(62) Division of application No. 09/729,351, filed on Dec. 5, 2000, now Pat. No. 7,808,663.

(30) Foreign Application Priority Data

| Dec. 7, 1999 | (JP) | 11-347750 |
| Dec. 28, 1999 | (JP) | 11-374672 |
| Dec. 28, 1999 | (JP) | 11-374673 |

(51) Int. Cl.
  *G06K 15/00* (2006.01)
(52) U.S. Cl. ....... 358/1.18; 358/1.15; 358/1.2; 358/449; 358/451; 358/450; 358/540; 399/204
(58) Field of Classification Search .............. 358/1.18, 358/1.15, 1.2, 449, 451, 450, 540; 399/204
See application file for complete search history.

(56) References Cited

U.S. PATENT DOCUMENTS

| 4,956,723 A | 9/1990 | Toda |
| 5,051,843 A | 9/1991 | Hayashi |
| 5,053,885 A | 10/1991 | Telle |
| 5,065,198 A | 11/1991 | Yamashita et al. |
| 5,103,490 A | 4/1992 | McMillin |
| 5,191,429 A | 3/1993 | Rourke |
| 5,357,348 A | 10/1994 | Moro |
| 5,548,406 A | 8/1996 | Aihara |
| 5,610,407 A | 3/1997 | Baba |
| 5,610,728 A * | 3/1997 | Sobue .................. 358/449 |
| 5,613,017 A | 3/1997 | Rao et al. |
| 5,946,527 A | 8/1999 | Salgado et al. |

(Continued)

FOREIGN PATENT DOCUMENTS

JP  03-209972 A  9/1991

(Continued)

*Primary Examiner* — Twyler L Haskins
*Assistant Examiner* — Michael Burleson
(74) *Attorney, Agent, or Firm* — Buchanan Ingersoll & Rooney PC

(57) ABSTRACT

The image forming apparatus receives image data based on multiple document images of various sizes and/or orientations. The apparatus identifies areas that are not yet assigned with document images on a single sheet of paper and identifies whether any document image can be laid out in an identified area. In another aspect of the apparatus, a maximum document image size is detected from multiple document images, and a scale factor is calculated to cause the detected maximum size match with the size of the entire area of the paper or an area obtained by dividing the paper into equal parts. In another aspect of the apparatus, a scaling factor is calculated for each document image to cause the size of the particular document match with the size of an area obtained by dividing the paper into equal parts.

8 Claims, 35 Drawing Sheets

U.S. PATENT DOCUMENTS

| | | |
|---|---|---|
| 5,957,600 A | 9/1999 | Ju |
| 6,188,490 B1 | 2/2001 | Miyake |
| 6,411,400 B1 | 6/2002 | Mori |
| 6,557,017 B1 | 4/2003 | Venable |
| 6,618,161 B1 | 9/2003 | Fresk et al. |
| 6,757,073 B1 | 6/2004 | Kuroda |
| 6,796,559 B2 | 9/2004 | Hirota et al. |

FOREIGN PATENT DOCUMENTS

| | | |
|---|---|---|
| JP | 06-313962 A | 11/1994 |
| JP | 08-102847 A | 4/1996 |
| JP | 10-174052 A | 6/1998 |
| JP | 10174052 * | 6/1998 |

* cited by examiner

| NO. | TITLE | STATUS | PAGES | COPIES | N in 1 |
|---|---|---|---|---|---|
| 1 | PRINT JOB | : PRINTING | 10 | 3 | ○ |
| 2 | PRINT JOB | : WAITING | 5 | 20 | ○ |
| 3 | COPY JOB | : WAITING | 7 | 1 | × |
| * | * * * | * * * | * | * * | |

FIG. 8
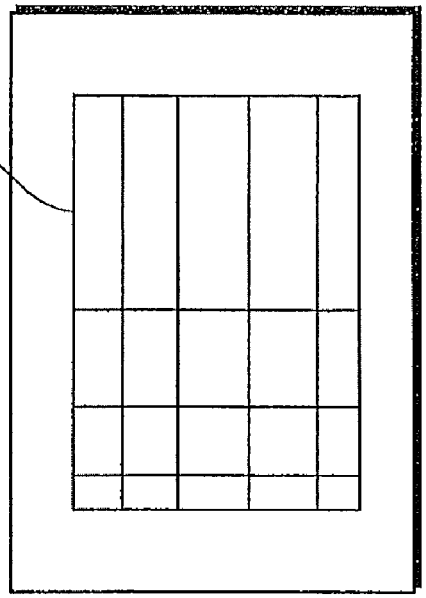
THE FOURTH IMAGE (A3)
TABLE
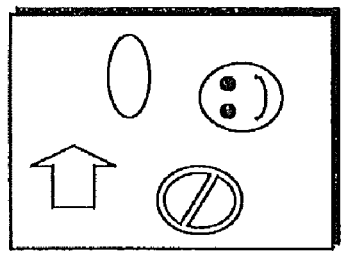
THE THIRD IMAGE (B5)
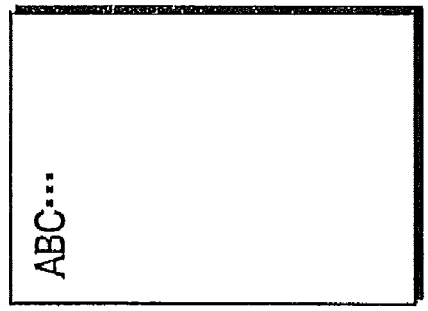
THE SECOND IMAGE (A4)
THE FIRST IMAGE (A4)

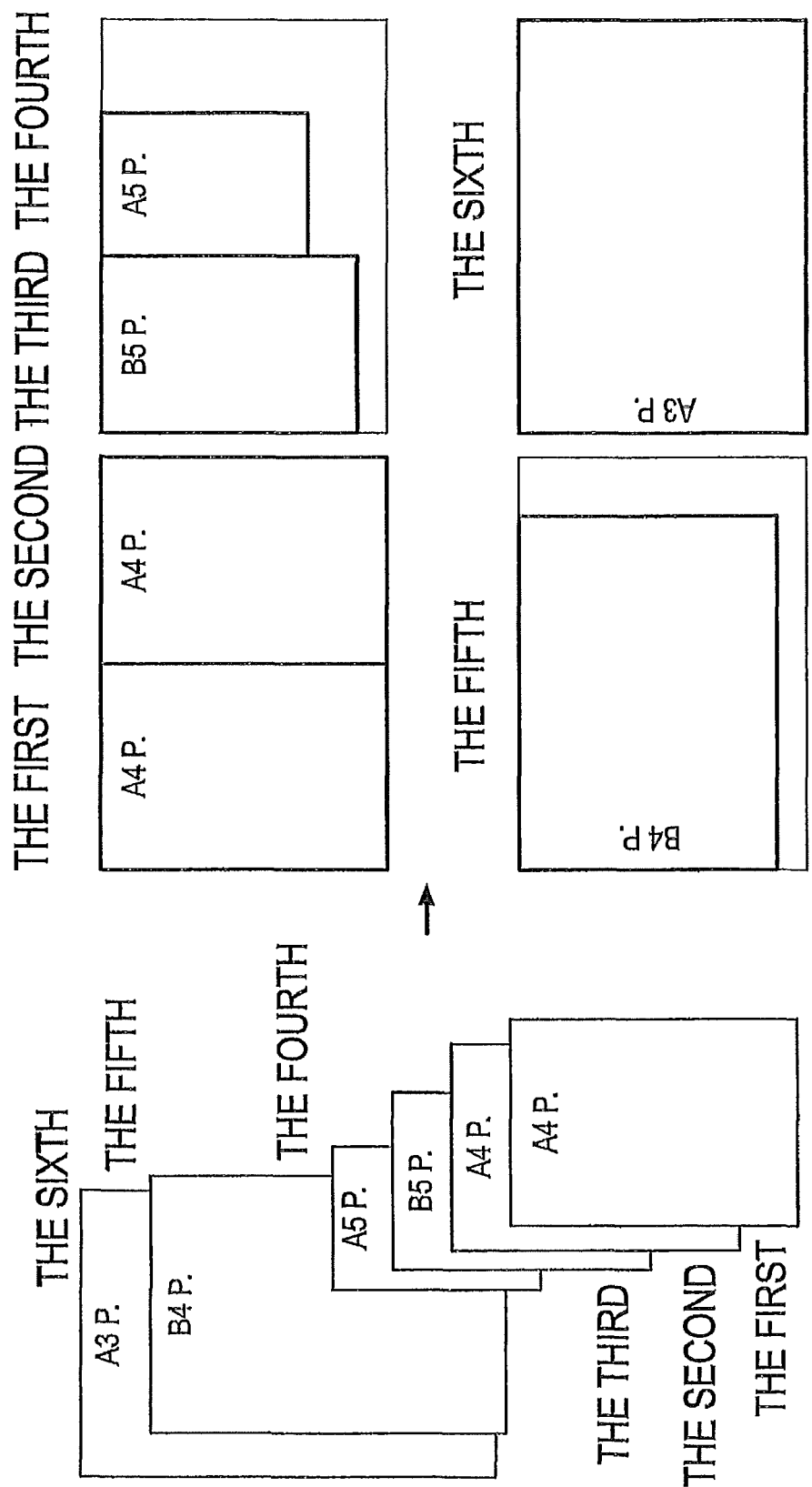

FIG. 15

PRINTER PROPERTY

NUMBER OF COPIES [1]

PAPER ORIENTATION [HORIZONTAL]

PAPER SIZE
| A5 | B5 |
| A4 | B4 |
| [A3] | AUTO |

STAPLE [✓] Z-FOLDING [✓]

MIXED SIZE DOCUMENTS → [✓]
UNIFORM SIZE

IMAGE PACKING [✓]

SET UP

| FIG. 16A |
| FIG. 16B |

FIG. 22
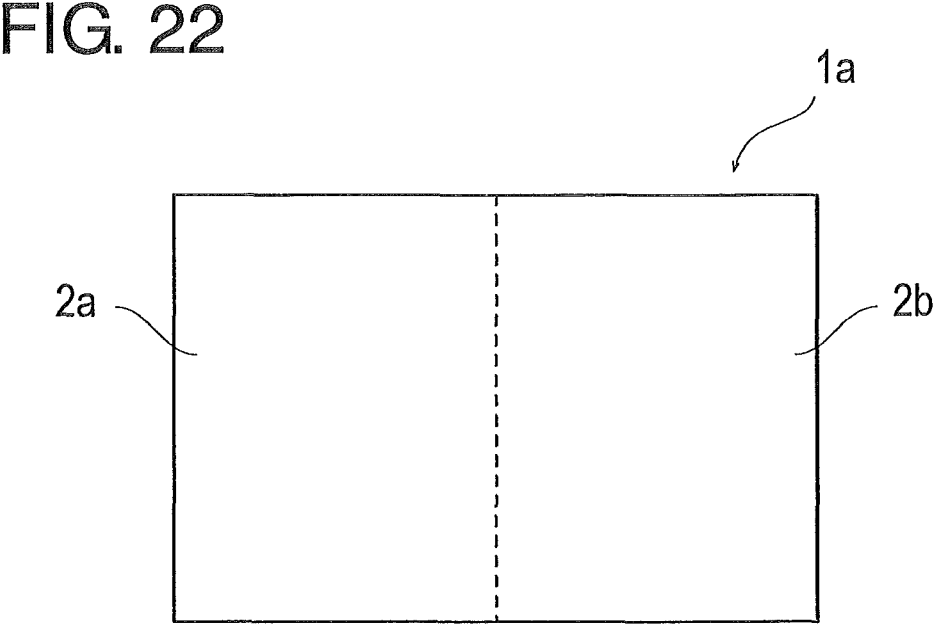
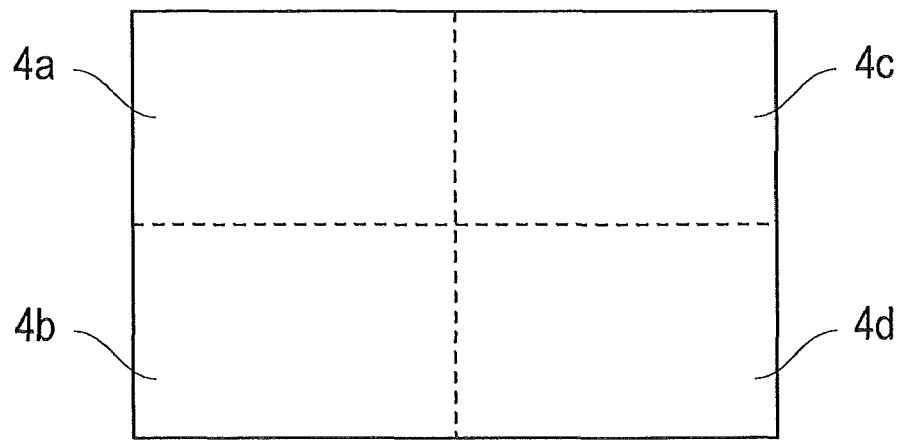

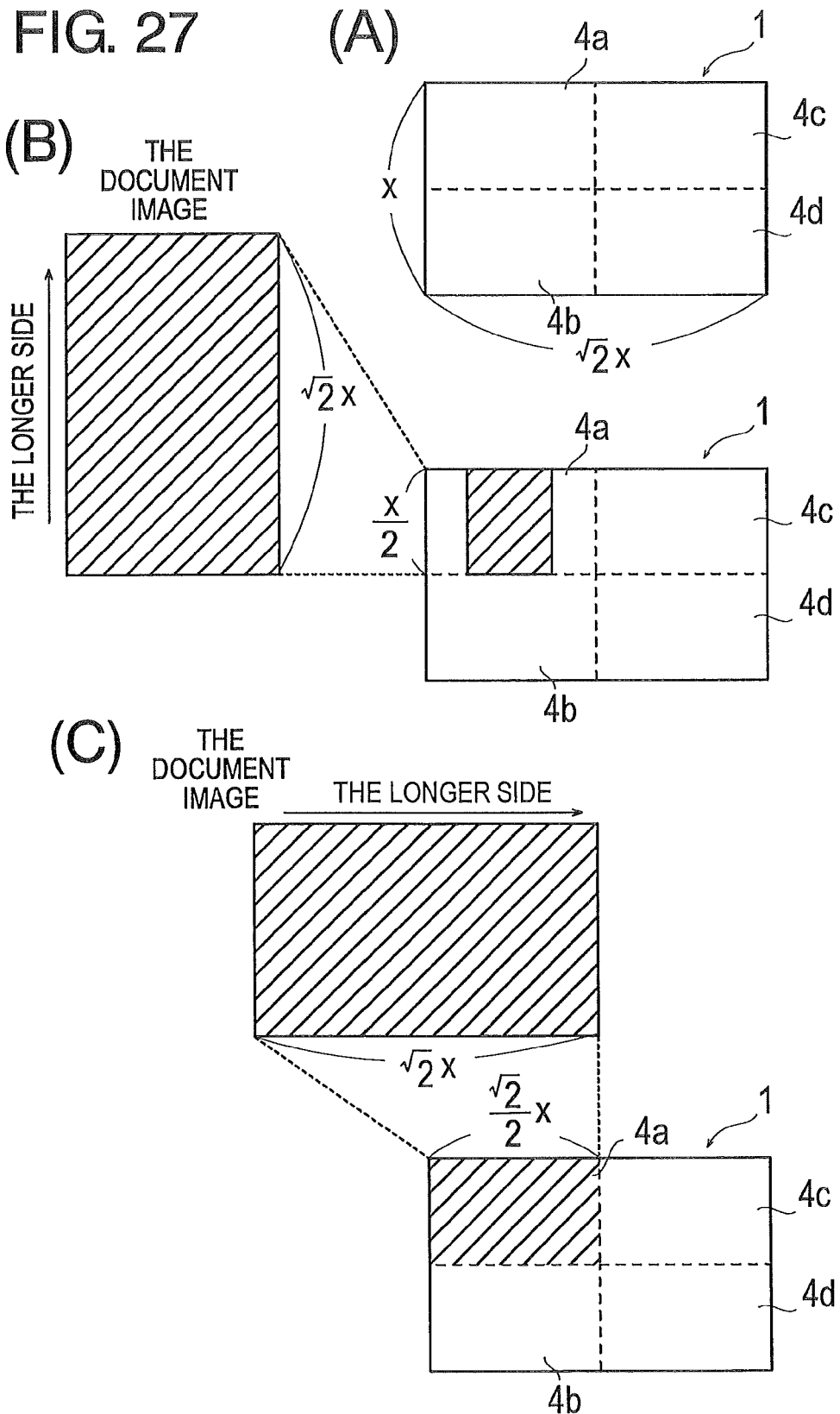

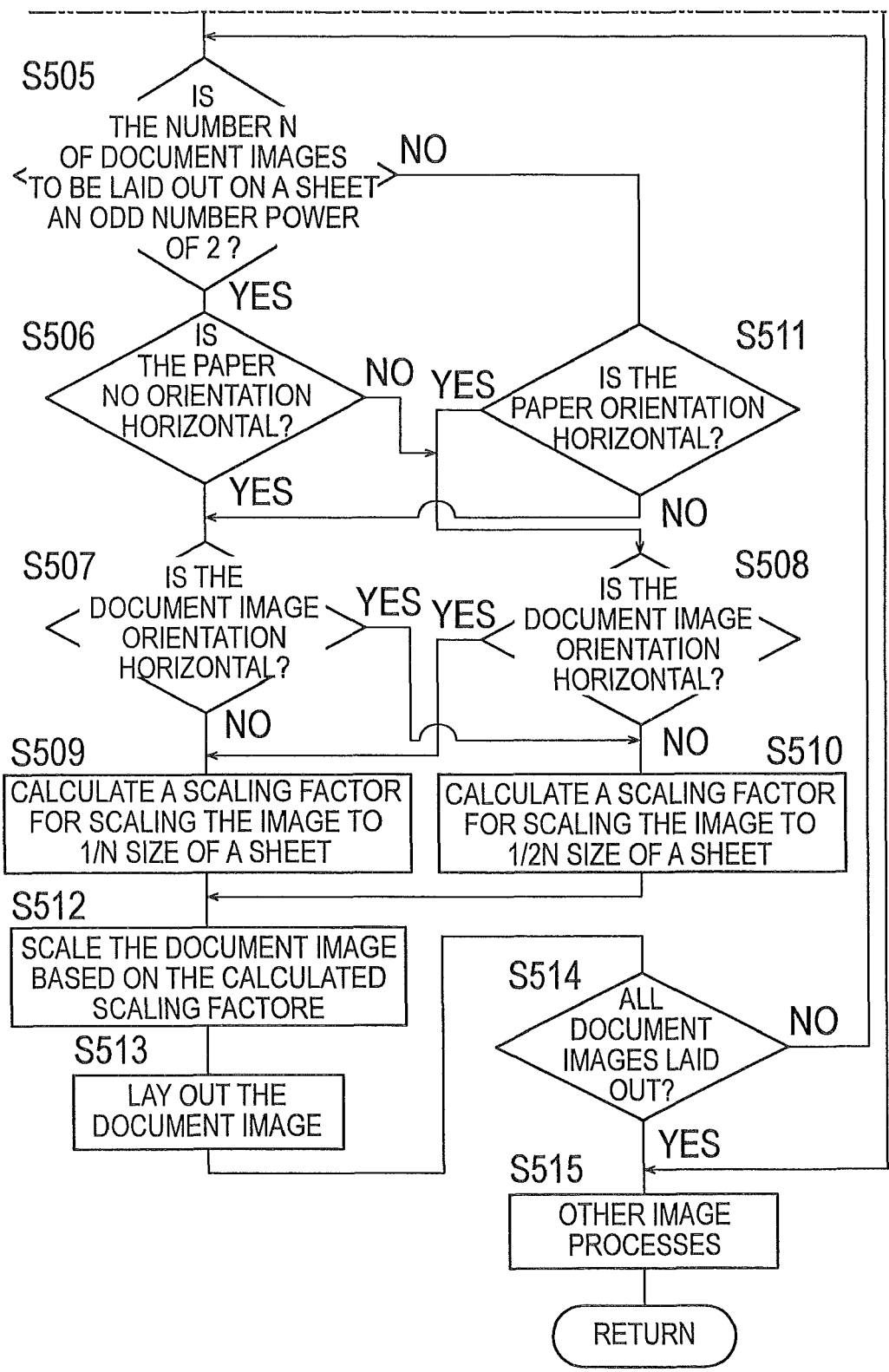

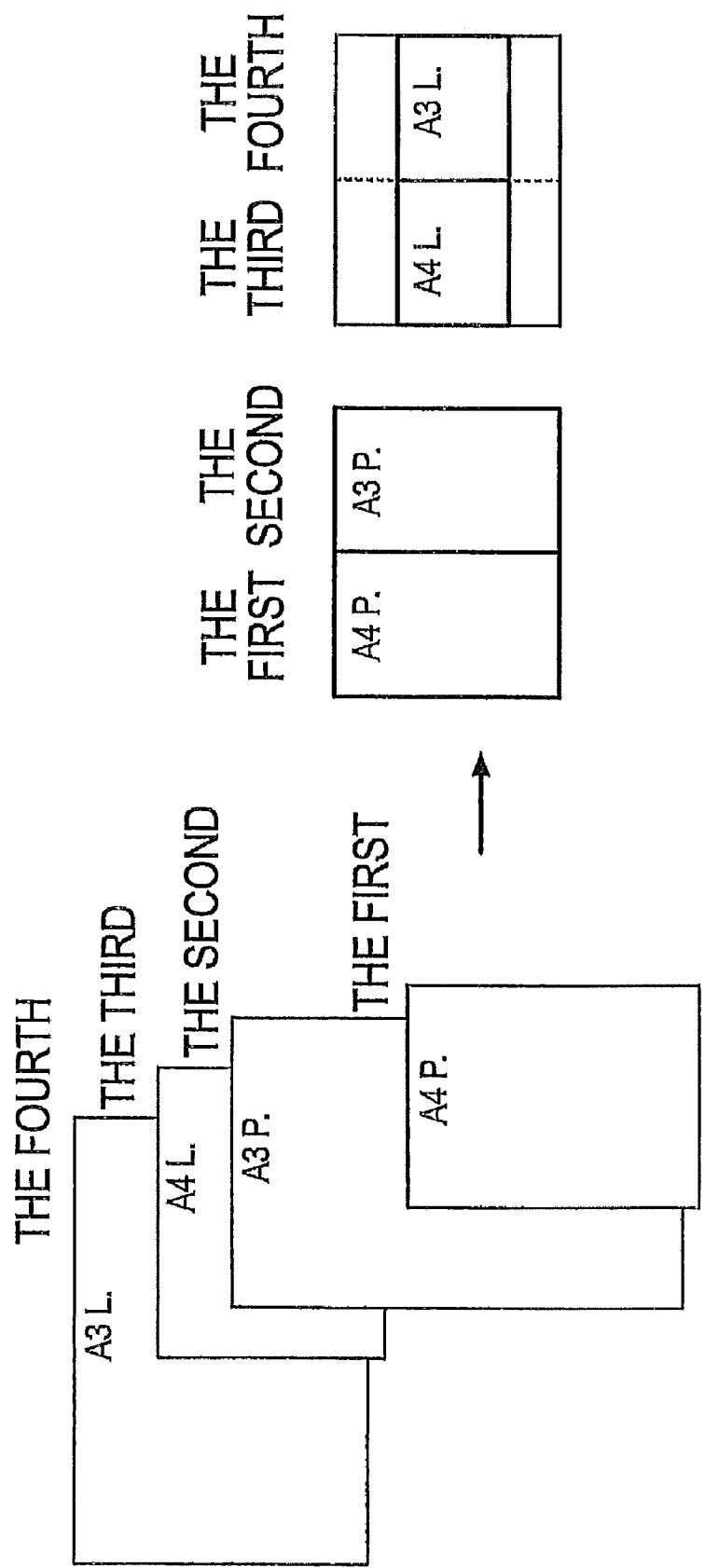

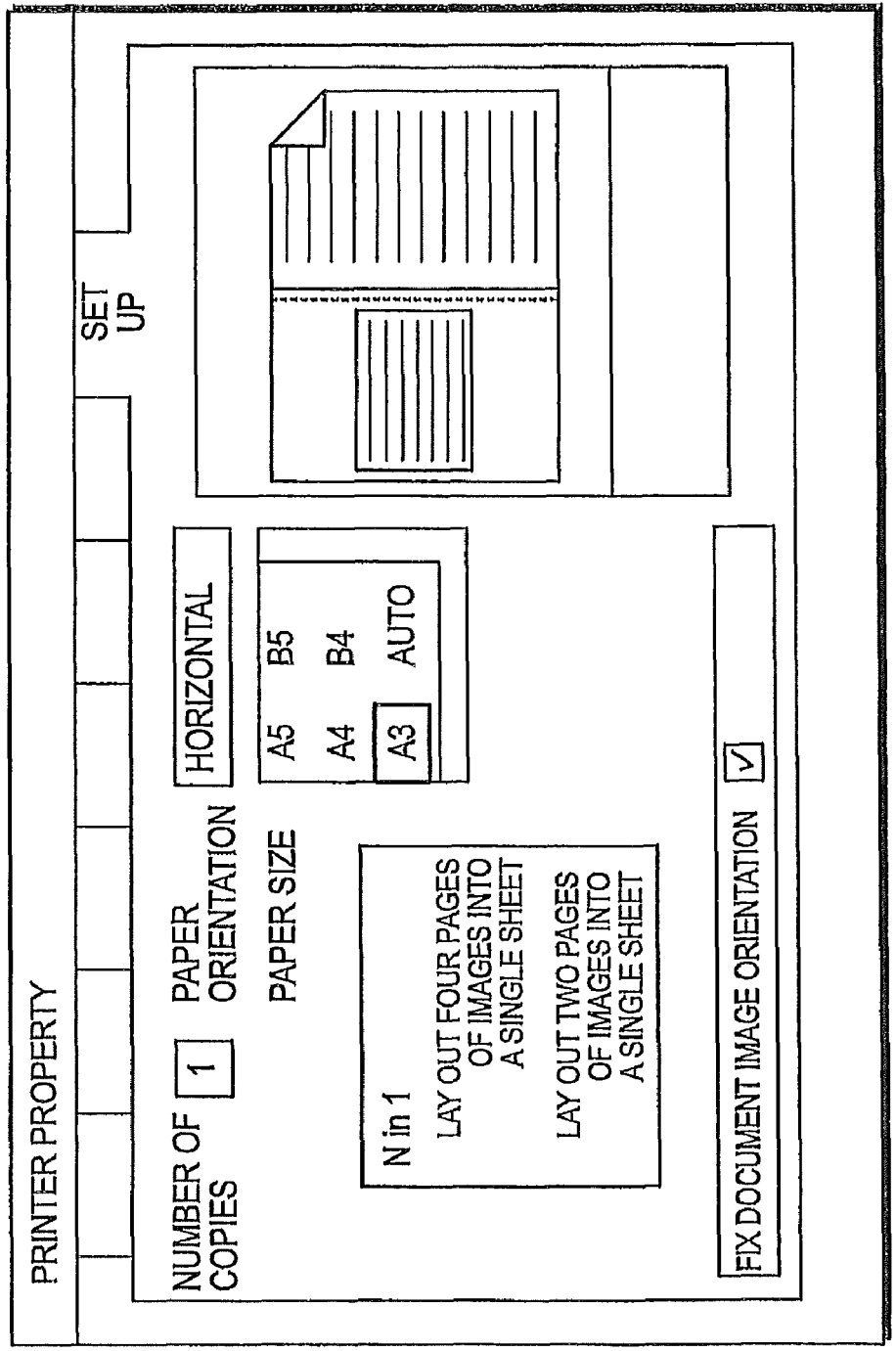

APPARATUS, METHOD AND COMPUTER PROGRAM PRODUCT FOR PROCESSING DOCUMENT IMAGES OF VARIOUS SIZES AND ORIENTATIONS

This application is a divisional of application Ser. No. 09/729,351, filed on Dec. 5, 2000, which is based on and claims priority under 35 U.S.C. §119 with respect to Japanese Patent Application No. 11-347750 filed on Dec. 7, 1999, Japanese Patent Application No. 11-374672 filed on Dec. 28, 1999, and Japanese Patent Application No. 11-374673 filed on Dec. 28, 1999. The entire contents of the prior applications is incorporated herein by reference.

BACKGROUND OF THE INVENTION

1. Field of the Invention

The present invention relates to an apparatus, method and computer program product for processing document images of various sizes and orientations.

2. Description of Related Art

A technology called "N-in-1 (N-up)" has also been known wherein N pieces of, or N pages of document images (where N is a positive integer equal to or larger than 2) to be arranged on one sheet of paper using conventional digital copiers and printers. This technology of printing N-pages of document on a single sheet of paper ("N-in-1 printing") allows us to view N-pages of document images at a glance and to save paper.

However, in performing the N-in-1 printing of multiple document images of various sizes using conventional image forming systems, it sometimes occurs that a portion of the images does not fit into the area of the sheet causing an image loss as a result. On the other hand, if the sheet size is changed depending on the size of each document image in order to prevent image losses, finishing processes such as stapling and punching become difficult because of the lack of uniformity in the paper size. As such, there has been no technology to perform the N-in-1 printing of multiple document images of various sizes and/or orientations. Moreover, in printing multiple document images of various sizes and/or orientations, it is preferable to process them in such a way that the printed matters are easier to read for the benefits of the user.

SUMMARY OF THE INVENTION

An object of this invention is to provide an image-processing apparatus, method and computer program product as well as an image forming apparatus that enables to print multiple document images of various sizes and/or orientations preventing any loss of document images and arranging them in easily viewable layouts.

According to an aspect of this invention, an image processing apparatus comprises a receiving unit for receiving image data based on multiple document images of various sizes and/or orientations, and a processing unit for processing the received document data so that the multiple document images can be printed on a sheet of paper, wherein the processing unit comprises an identifying unit for identifying an area which is not yet covered with document images, and a judging unit for judging whether new document image or images can be laid out in the area.

According to another aspect of the invention, an image processing method comprises a receiving step for receiving image data based on multiple document images of various sizes and/or orientations, and a processing step for processing the received document data so that the multiple document images can be printed on a sheet of paper, wherein the processing step comprises an identifying step for identifying an area which is not yet covered with document images, and a judging step for judging whether new document image or images can be laid out in the area.

According to still another aspect of the invention, a computer program product for image processing comprises a receiving step for receiving image data based on multiple document images of various sizes and/or orientations, and a processing step for processing the received document data so that the multiple document images can be printed on a sheet of paper, wherein the processing step comprises an identifying step for identifying an area which is not yet covered with document images, and a judging step for judging whether new document image or images can be laid out in the area.

According to a further aspect of the invention, an image forming apparatus comprises a receiving unit for receiving image data based on multiple document images of various sizes, a detecting unit for detecting a maximum size of document images based on the received image data, a selecting unit for selecting paper with a size equal to or larger than the detected maximum size, and a forming unit for forming images based on the image data on the selected paper.

According to a still further aspect of the invention, An image forming apparatus comprises a receiving unit for receiving image data based on multiple document images of various sizes, a detecting unit for detecting a maximum size of document images based on the received image data, a calculating unit for calculating a scaling factor that causes the detected maximum size to match with the size of a print area, a processing unit for scaling up or down the sizes of the document images based on the calculated scaling factor, and a forming unit for forming images based on the processed image data on the print area.

According to a yet further aspect of the invention, an image processing method comprises a receiving step for receiving image data based on multiple document images of various sizes, a detecting step for detecting a maximum size of document images based on the received image data, a calculating step for calculating a scaling factor that causes the detected maximum size to match with the size of a print area, and a processing step for scaling up or down the sizes of the document images based on the calculated scaling factor.

According to a yet further aspect of the invention, a computer program product for image processing comprises a receiving step for receiving image data based on multiple document images of various sizes, a detecting step for detecting a maximum size of document images based on the received image data, a calculating step for calculating a scaling factor that causes the detected maximum size to match with the size of a print area, and a processing step for scaling up or down the sizes of the document images based on the calculated scaling factor.

According to a yet further aspect of the invention, an image forming apparatus comprises a receiving unit for receiving image data based on multiple document images of various sizes, a detecting unit for detecting the size of each document image based on the received image data, a calculating unit for calculating a scaling factor that causes the detected size of each document image match with the size of a print area obtained by dividing the paper into equal parts, a processing unit for scaling up or down the sizes of each document image based on each corresponding calculated scaling factor, and a forming unit for forming each image based on the processed image data in each print area obtained by dividing the paper into equal parts.

According to a yet further aspect of the invention, an image processing method comprises a receiving step for receiving image data based on multiple document images of various sizes, a detecting step for detecting the size of each document image based on the received image data, a calculating step for calculating a scaling factor that causes the detected size of each document image match with the size of a print area obtained by dividing the paper into equal parts, and a processing step for scaling up or down the sizes of each document image based on each corresponding calculated scaling factor.

According to a yet further aspect of the invention, a computer program product for image processing comprises a receiving step for receiving image data based on multiple document images of various sizes, a detecting step for detecting the size of each document image based on the received image data, a calculating step for calculating a scaling factor that causes the detected size of each document image match with the size of a print area obtained by dividing the paper into equal parts, and a processing step for scaling up or down the sizes of each document image based on each corresponding calculated scaling factor.

BRIEF DESCRIPTION OF THE DRAWINGS

FIG. 8 is a diagram showing a specific example of multiple document images of various sizes and orientations;

FIG. 11 is a diagram showing a layout example based on the process shown in FIG. 10A and FIG. 10B;

FIG. 15 is a drawing showing a specific example of the display screen of the printer driver in the first embodiment of the present invention;

FIG. 22 is a diagram for describing the standard print areas where the sheet is divided into equal parts;

FIG. 27 is a diagram for describing image layout process corresponding to the third embodiment of the present invention when the orientation of the document image is different from that of FIG. 26;

FIG. 28A and FIG. 28B show a flowchart showing an example of image layout process corresponding to the third embodiment of the present invention;

FIG. 29 is a drawing showing an example of image layout based on the process shown in FIG. 28A and FIG. 28B;

FIG. 32 is a diagram showing a specific example of the display screen of the printer driver in the third embodiment of the present invention.

DESCRIPTION OF THE PREFERRED EMBODIMENT

Preferred embodiments of the invention will be described below referring to the accompanying drawings.

First Embodiment

In the image processing corresponding to the first embodiment, the image data is processed in such a way as to arrange multiple document images on a single sheet of paper. The feature of this image processing is that it identifies areas where no document images are laid out yet on a sheet of paper and judges whether any new document image can be laid out.

Figure 1:
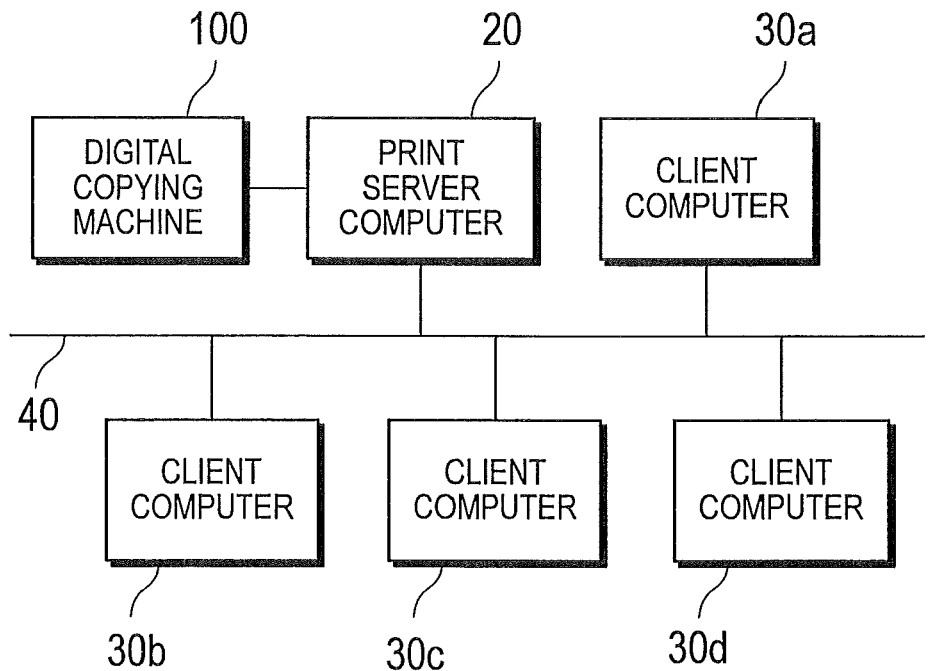
FIG. 1 is the schematic diagram of an image forming system to which the present invention is applied.

FIG. 1 shows the constitution of the network image forming system to which this invention is applied. In this image forming system, a digital copying machine 100, a print server computer ("print server") 20, multiple client computers ("clients") 30a, 30b, 30c, and 30d are interconnected by a network 40. As a result, data communication of image data and various commands can be exchanged between the clients 30a through 30d and the print server 20 as well as between the clients 30a through 30d. The digital copying machine 100 is not only capable of making copies of the document, but also is capable of printing image data received from other equipment such as the clients 30a through 30d via the print server 20.

Figure 2:
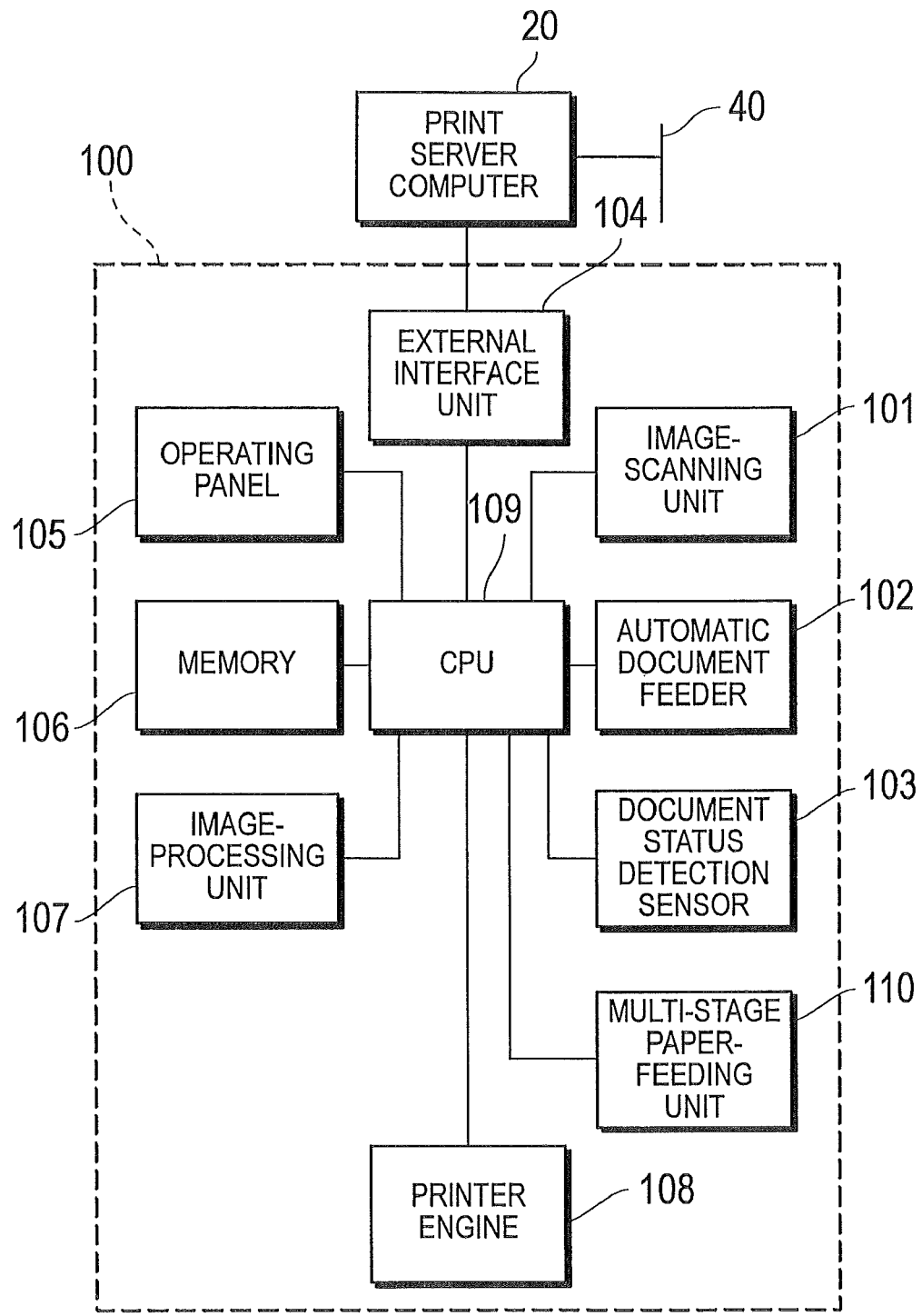
FIG. 2 is the block diagram of the digital copying machine shown in FIG. 1.

FIG. 2 is a block diagram of the control system of the digital copying machine shown in FIG. 1. The digital copying machine 100 has the following constitution as shown in FIG. 2. An image-scanning unit 101 scans documents and forms image data based on the captured document images. An ADF (automatic document feeder) 102 feeds multiple sheets of document automatically one sheet at a time. A document status detection sensor 103 detects the size and orientation of the document being read. An external interface unit 104 connects the digital copying machine 100 to the print server 20. The operating panel 105 is used for inputting various setup. A memory 106 stores programs and data. An image-processing unit 107 provides image processing to the processed image data. A printer engine 108 prints out the processed image data on paper. A multi-stage paper-feeding unit 110 supplies multiple kinds of sheets with various sizes and orientations. A CPU 109 controls all of these units 11 through 18.

For the digital copying machine 100 to function as a copying machine, the CPU 109 controls various parts based on instructions from the operating panel 105. More specifically, the document is scanned on the image-scanning unit 101. The printer engine 108 prints the received image data on paper. The copying process is conducted based on the copying condition (paper size, scaling factor, number of copies, density, double/single side printing, N-in-1, sort/non-sort, etc.).

For the digital copying machine 100 to function as a printing machine, the image data transmitted by the clients 30a through 30d are received with the printing condition through the external interface 104 via the prints server 20. The printer engine 108 prints the received image data. The printing condition and the copying condition as well as the image data are controlled together as a job. The jobs include copy jobs that are jobs when the digital copying machine 100 functions as a copying machine and the printing jobs that are jobs when the digital copying machine 100 functions as a printing machine.

Figure 3:
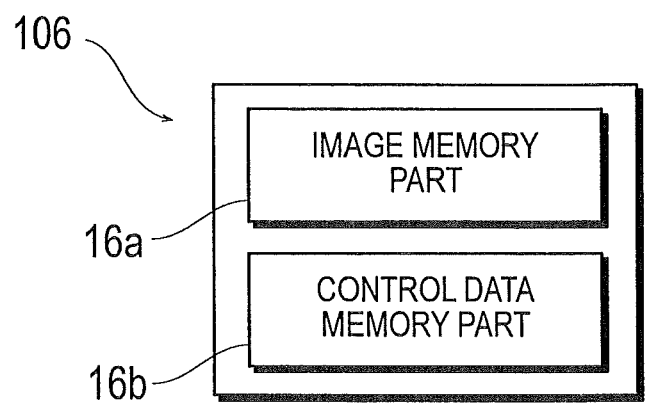
FIG. 3 is the constitutional diagram of the memory shown in FIG. 2.

The memory 106 consists of a ROM (read only memory) and a RAM (random access memory), which are not shown in the drawing. The ROM stores the control program. The RAM has an image memory part 16a that stores the image data and a control data memory part 16b that stores the control data as shown in FIG. 3. The control data is a control table that stores the setup contents of the printing/copying condition and the current processing condition. This control table consists of a job control table that controls jobs, a paper supply port control table that controls the information of paper supply cassettes, etc. The job control table includes the printing/copying conditions being set up and information concerning the image data storage places.

Figures 4, 7:
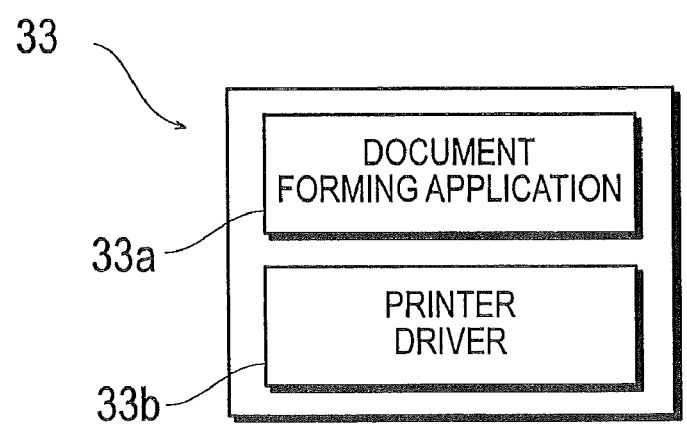
FIG. 4 is a diagram showing a job list.
FIG. 7 is a drawing showing an example of the software configuration within the hard disk shown in FIG. 6.

The operating panel 105 comprises the operating keys such as a start key and a ten-key pad as well as a touch screen display. The display is used for displaying detailed contents of the printing conditions for the current job or displaying the job list. The user can switch between the printing condition display and the job list display. The job list shows the contents of each job and its progress status. FIG. 4 shows the case when the job list is displayed. In case of FIG. 4, it displays for each job the title of the job (copy job/print job), the status (printing/waiting), the total number of pages, the number of copies, and whether the N-in-1 printing is setup (o/x).

Figure 5:
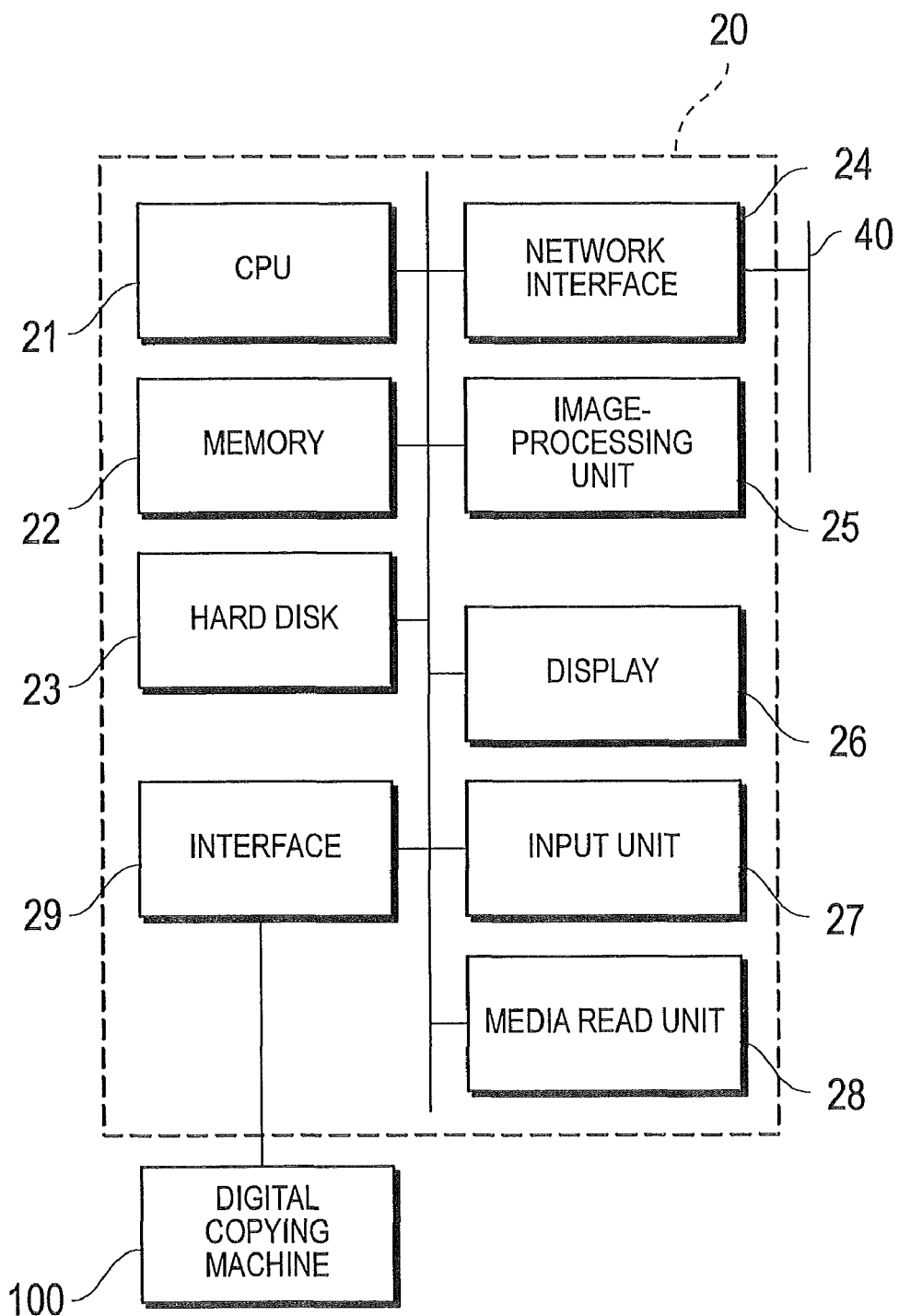
FIG. 5 is the block diagram of the print server shown in FIG. 1.

FIG. 5 is a block diagram of the control system of the print server 20 shown in FIG. 1. The print server 20 has the following constitution, which is shown in FIG. 5. A CPU 21 controls the entire print server 20. A memory 22 and a hard disk 23 store programs and data. A network interface 24 connects the print server 20 to the network 40. An image-processing unit 25 applies image processing to the image data as described later. A display 26 displays various screens. An input unit 27 comprises a keyboard and/or a mouse. A media read unit 28 reads out the data stored in various recording media such as floppy disks, CD-ROMs, etc. An interface 29 connects the print server 20 to the digital copying machine 100.

Figure 6:
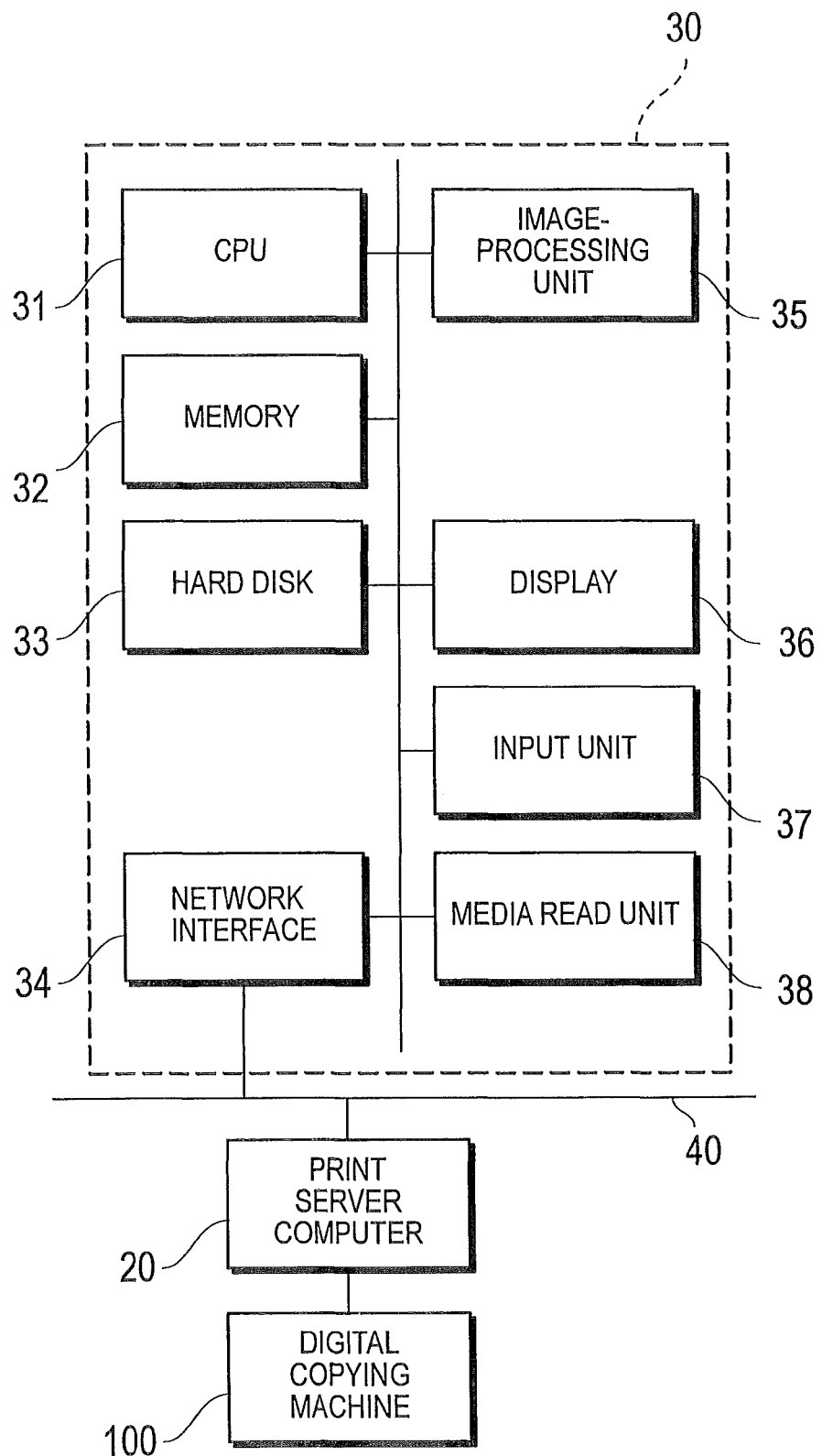
FIG. 6 is the block diagram of each client shown in FIG. 1.

FIG. 6 is the block diagram of each of the clients 30a through 30d. For the convenience sake, a typical client is shown here with the reference number 30. The client 30 has a basic structure similar to that of the print server 20. The client 30 comprises a CPU 31, a memory 32, a hard disk 33, a network interface 34, an image-processing unit 35, a display 36, an input unit 37, and a media read unit 38. The network interface 34 connects the client 30 to the network 40.

FIG. 7 shows an example of the software configuration within the hard disk shown in FIG. 6. A hard disk 33 has a document forming application 33a and a printer driver 33b installed. The document forming application 33a is, for example, word processing software. The printer driver 33b is a program that controls a digital copying machine 100 when the digital copying machine 100 functions as a printer. The user can set up a desired printing condition using the printer driver 33b when the user prints a document prepared and/or edited using the document preparing application 33a. The printer driver 33b prepares print jobs based on specified printing conditions. Prepared print jobs are transmitted from the client 30 to the digital copying machine 100 via the network 40 and the print server 20.

The image forming system simplifies the printing process of multiple document images of various sizes and/or orientations. FIG. 8 shows a specific example of document images of various sizes and orientations that the image forming system corresponding to the present invention can handle. The first and second document images shown in FIG. 8 are of the A4 size. The third document image is a graphic image of the B5 size. The fourth document image is a table of the A3 size.

The image forming system that corresponds to the first embodiment receives image data based on multiple document images of various sizes and/or orientations from the image scanner 101. Then it processes the data in such a way as to be able to print multiple document images on a single sheet of paper. More specifically, it first identifies areas of the sheet that are not yet assigned with document images ("unassigned areas"). Next, it judges whether it is possible to lay out new document images in the unassigned areas. If no new document image or images are found to be able to be laid out on the unassigned areas, the new document image or images are laid out on another sheet.

More specifically, the first selected document image is laid out on a sheet of paper that corresponds to the first page. The second selected document image is laid out on an area of the first sheet, where the first document image is not laid out. The third selected document image is laid out on an area of the first sheet, where neither the first image nor the second image is laid out. Similarly, the fourth selected document is laid out on an area of the same sheet of paper as long as it is possible to do so. Thus, as many document images as possible are laid out on a single sheet of paper in this invention. Preferably, multiple document images are arranged adjacent to each other. Multiple images are arranged in such a way as to minimize gaps between document images.

According to the process of the first embodiment, the N-in-1 process is made possible wherein multiple document images (of multiple pages) are synthesized to form a new output image data. According to the conventional N-in-1 process, the number of document images that can be arranged on a single sheet of paper is limited to two even if three document images can be physically laid out on the sheet once the number of document images to be laid out is set to two. On the contrary, according to the present invention, three document images are laid out on a single sheet of paper as long as it is physically possible to lay out three document images. The process of laying out document images and forming output document image data in such a manner ("image layout process") is executed on the memory 106.

The contents of the process for the digital copying machine outlined in the above are described in the following in two separate cases, i.e., a case where the digital copying machine executes copying and a case where it executes printing.

<Copying Process>

Figure 9:
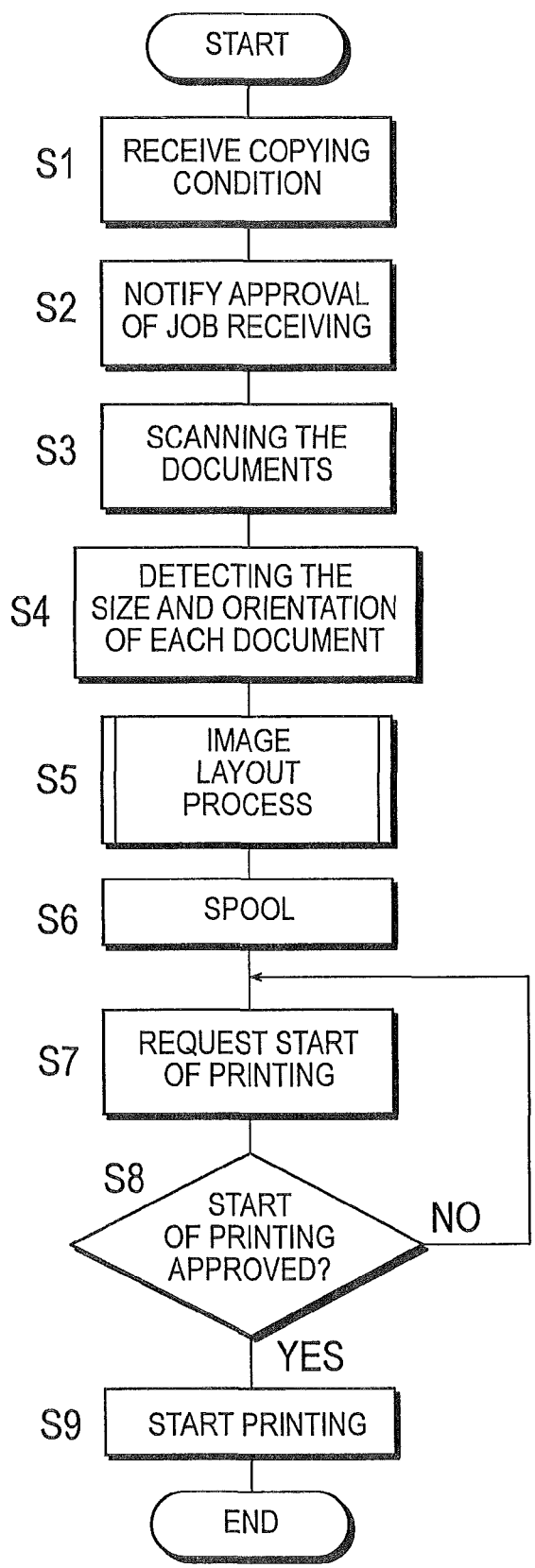
FIG. 9 is a flowchart showing the contents of the copying process on a digital copying machine.

FIG. 9 is a flowchart that shows the contents of copying process by means of the digital copying machine. The CPU 109 of the digital copying machine 100 receives the copying condition instructed by the operating panel 105 (S1). The copying condition contains instructions such as paper size, scaling factor, density, double/single side, N-in-1, sort/non-sort, etc. The received copying condition is stored in the control data memory part 16b. The CPU 109 judges whether the copy job can be executable on the digital copying machine 100 based on the copy condition. If the copy job is executable, it informs the operating panel 105 the approval of the acceptance of the copy job. When it is approved, the operating panel 105 changes the display. As a result, the acceptance of the copy job will be displayed (S2).

When the start key of the operating panel 105 is pressed, the ADF 102 feeds the document one sheet at a time to the image scanner unit 101. The image scanner unit 101 forms the document image data by scanning the documents that are fed to it (S3). The document image data that are obtained by scanning are stored in the image memory part 16a. A document status detection sensor 103 detects the size and orientation of each document (S4). The detected size and orientation are stored in the control data memory part 16b.

The image-processing unit 107 refers to the copying condition stored in the control data memory part 16b. The image-processing unit 107 executes the image layout process (S5). More specifically, the image-processing unit 107 edits the document image data so that it coincides with the referred copying condition, and forms a new output image data. As a result, image losses can be prevented as mentioned before, the size of the output paper size becomes uniform, and printed matters become easier to read. The output image data that are newly formed are spooled at the image memory 16a (S6). The control data memory part 16b stores the data indicating each job's progress status as a control table.

When the printing start request is made (S7), a judgment is made whether the printing should be approved (S8). More specifically, the progress status of the previous print job at the digital copying machine 100 is judged by referencing the control table. If the newly accepted job is executable immediately, the start of printing is approved (S8: YES). Consequently, the printer engine 108 starts printing (S9). On the other hand, if it is decided that the printing cannot be started immediately due to such a reason that the previous print job is in progress, etc. (S8: NO), the printing will be withheld until the printing start is approved (S9). After the printer engine 108 executes the printing, the finisher (not shown) can perform finishing processes such as paper folding, stapling, and punching processes.

Figure 10A:
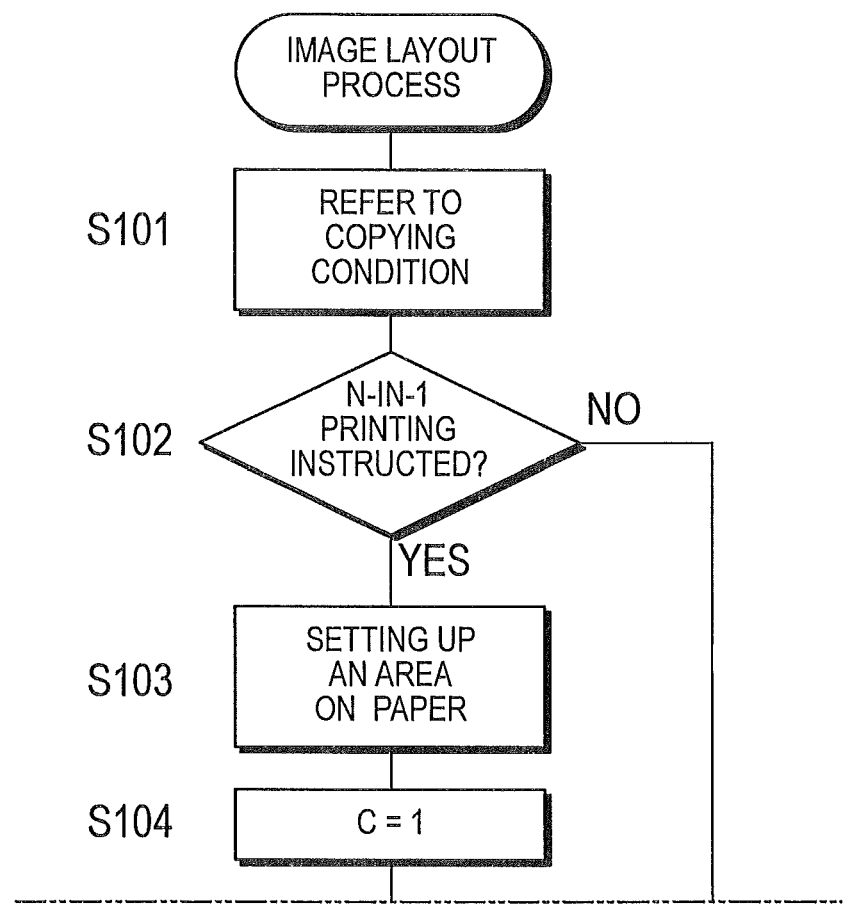
FIG. 10A and FIG. 10B show a flowchart showing an example of the image layout process corresponding to the first embodiment of the invention.
Figure 10B:
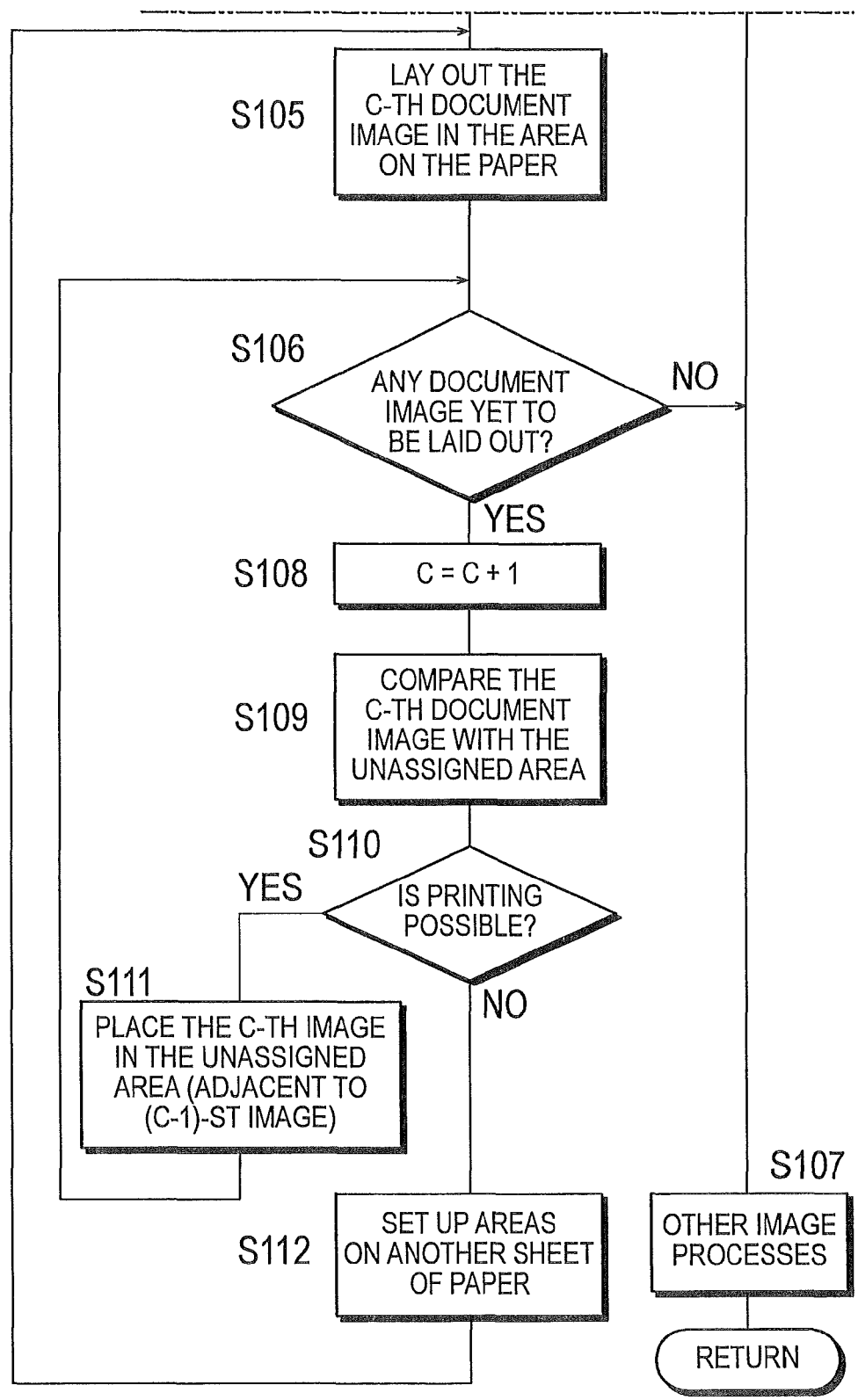

The content of the image layout process that is characteristic of the present embodiment is described below. FIG. 10A and FIG. 10B are the flowcharts that indicate the contents of the image layout process in more detail, which will be described at the step S5 of the flowchart of FIG. 9. The image layout process can be executed on the memory 106. More specifically, the data area that corresponds to the area of a single sheet of output paper is set up on the memory 106. Multiple document images will be laid out on this data area and the output image data will be formed.

The CPU 109 refers to the copying condition stored in the control data memory part 16b (S101). The processing is executed as follows if it is determined that the N-in-1 printing is to be executed as a result of the reference (S102). There is no need to set up the number of document images to be laid out in the area of a single sheet of paper in advance in case of the processing according to the first embodiment. In other words, a proper process will be automatically selected form the N-in-1 print, such as the 2-in-1 print where two document images are laid out in the area of a single sheet of paper, the 3-in-1 print where three document images are laid out in the area of a single sheet of paper, the 4-in-1 print where four document images are laid out in the area of a single sheet of paper, etc. In some cases, the 1-in-1 print is selected, where only one document image is laid out in the area of a single sheet of paper.

The size of the entire area on the paper is identified by referencing the data about the paper size stored as a part of the copying condition at the control data memory part 16b. As a result, the area on the first sheet of paper is set up (S103).

If there is no instruction about the paper size is included in the copying condition, the paper size can be selected as follows. The document status detection sensor 103 detects the document size and orientation based on the document image data received. The CPU 109 determines the size of the largest document image among the multiple document images based on the detection result. The CPU 109 selects a paper size equal or larger than the size of the detected paper.

Next, the counter value C concerning the order of the document image is set to 1 (S104). As shown in the succeeding FIG. 10B, the image-processing unit 107 lays out the first document within the areas of the first sheet of the paper (S105). In reality, the image-processing unit 107 writes the document image on the data area that corresponds to a single sheet of the paper specified in the memory 106. The image-processing unit 107 lays out document images as densely as possible in order to save the paper as much as possible. For example, the document-processing unit 107 can lay out the first document image in such a way as to cause it to abut with a corner or edge of the area of the paper. The image-processing unit 107 can also lay out alternatively in such a way as to leave a specified narrow space between the first document image and a corner or edge of the area on the paper.

A judgment is made at this point as to whether there are any document images yet to be laid out in the received document image data (S106). If it is judged as a result that there is no more document image to be laid out (S106: NO), other ancillary image processes are done (S107) to complete image layout processes. On the other hand, if it is judged that there are document images yet to be laid out (S106: YES), the value C of the counter is incremented by 1 to make C=2 (S108).

The image-processing unit 107 identifies the size of the second document image. The image-processing unit 107 also identifies the unassigned area. The unassigned area at the time when the first document image is laid out is the entire area of the first sheet of paper minus the area where the first document image is laid out. The image-processing unit 107 compares the size of the second document image to be laid out and the size of the unassigned area (S109). If it is determined as a result of the comparison that the second document image can be printed within the unassigned area, the image-processing unit 107 will lay out the second document image in the unassigned area (S110, S111). In other words, the image-processing unit 107 will lay out the second document image in the unassigned area of the first sheet of paper if the second document image can be laid out in the unassigned area without causing any loss of the image.

The image-processing unit 107 can also lay out the second document image in such a way as to abut with the first document image laid out in the previous layout. In other words, the image-processing unit 107 can lay out multiple document images without leaving any spaces between them in certain directions. For example, it can lay out multiple document images without leaving any spaces between them in the upward and leftward directions. The image-processing unit 107 can lay out multiple document images abutting each other. Alternatively, the image-processing unit 107 can lay out the document images leaving a certain space between the already laid out document images and the one being laid out this time.

The image-processing unit 107 compares the size of the C-th document image to be laid out and the unassigned area at that point, i.e., the area that has not been laid out with the document images of the first through the (C-1)-st document images. If the C-th document image can be printed within the unassigned area without causing any image loss (S110: YES), the image-processing unit 107 lays out the C-th document image in the unassigned area (S111). On the other hand, if it is determined as a result of the comparison that the C-th document image cannot be printed in the unassigned area of the first sheet of paper (S110: NO), in other words, the C-th document image does not fit within the unassigned area and causes an image loss, the image processing unit 107 will lay out the C-th document image on another paper area (area on the second sheet of paper in this case) (S112, S105). As a result, it is finalized that the first through the (C-1)-st document images are to be laid out on the first sheet of paper. In other words, the first through (C-1)-st document images will be synthesized to form a new image data. By repeating the similar processes, document images will be laid out sequentially on the second and the following sheets to form the output image data.

When all documents are laid out (S106: YES), the image-processing unit 107 executes other image processes such as spacing setup (S107). Specifically, the image-processing unit 107 adjusts the distances between the edges and the document images and/or the distances between multiple document images to be laid out on the sheets of paper as a part of the ancillary processes.

More specifically, documents may be laid out in an unbalanced status in the area of the sheet before the processes of the step S107. As mentioned before, the document images are laid out without leaving any spaces between them in the upward and leftward directions in this embodiment. This provides a more effective use of the uncovered space and increases the probability of laying out a new document image in the uncovered space. However, despite the effort of optimizing the uncovered space by laying out the documents leaving no spaces between them in the upward and leftward directions, it may not be able to lay out the new document image in the uncovered space in some cases. This may leave the document images laid out in an unbalanced condition in the area of the sheet. In order to avoid the document images left in an unbalanced condition, the document-processing unit 107 can rearrange the layout of the document images in a more balanced manner as a final adjustment.

Figure 12:
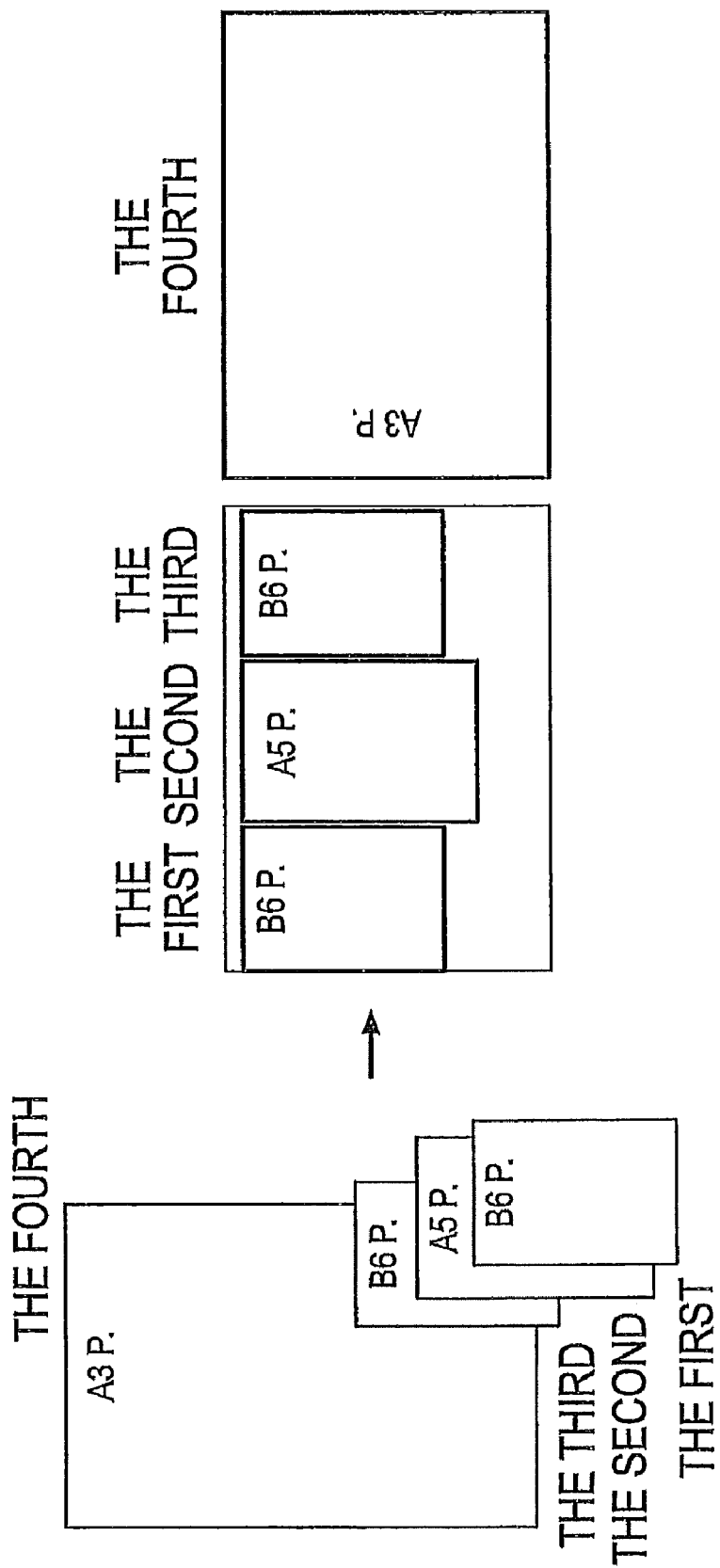
FIG. 12 is a diagram showing another layout example based on the process shown in FIG. 10A and FIG. 10B.

FIG. 11 and FIG. 12 are the example layouts based on the processes shown on FIG. 10A and FIG. 10B. FIG. 11 shows an example of laying out document images on the A3 size paper in a horizontal position ("landscape"). The document images shown in FIG. 11 consist of the first document image of the A4 size, the second document image of the A4 size, the third document image of the B5 size, the fourth document image of the A5 size, the fifth document image of the B4 size, and the sixth document image of the A3 size. The orientation of all the documents shown in FIG. 11 is vertical (portrait).

The first document image is the first selected document image, and is normally the image on the first page of the document. The same rule applies to the second and the images thereafter.

The size of the first document image in this case is A4. No document image is laid out on the first sheet of paper in the beginning. The entire area of the first sheet of paper is thus the unassigned area. Therefore, the first document image will be laid out in this area of the paper. The image-processing unit 107 tries to lay it out as closely as possible to the leftward and upward edges of the area. Thus, the first document image will be laid out in the left half of the paper. As a result, the unassigned area of the first sheet of paper becomes the area left by subtracting the area where the first document image of the A4 size is laid out from the entire area of the A3 size paper (right half of the area of the sheet).

The size of the second document image is A4. Since the second document image can be laid out in the unassigned area of the first sheet of paper, it will be laid out on the unassigned area. This leaves no unassigned area on the first sheet of paper (the size of the unassigned area becomes zero). The third document image of the B5 size cannot be printed within the unassigned area of the first sheet of paper. The third document image will be laid out in another area of paper, i.e., the area of the second sheet of paper. As a result, the unassigned area of the second sheet becomes the area obtained by subtracting the area where the third document image of the B5 size is laid from the entire area of the A3 size paper.

The size of the fourth document image is A5. Since the fourth document can be printed in the unassigned area of the second sheet of paper, it is laid in the unassigned area. As a result the unassigned area of the second sheet paper becomes the area obtained by subtracting the area where the third document image of the B5 size and the fourth document image of the A5 size are laid from the entire area of the A3 size paper. The image-processing unit 107 can lay out the fourth document in such a way as to abut the third document.

The size of the fifth document image is B4. The fifth document image cannot be printed in the unassigned area of the second sheet of document. Therefore, the fifth document image is laid out in the area of the third sheet of paper. As a result, the unassigned area on the third sheet of paper becomes the area obtained by subtracting the area where the fifth document image of the B4 size is laid from the entire area of the A3 size paper. The size of the sixth document image is A3. As a result, the sixth document image is laid out in the area of another paper, i.e., in the area of the fourth sheet of paper. Thus, all the document images are laid out to complete the output image data preparation.

FIG. 12 shows a case of laying out document images on the A3 size paper in the landscape orientation. The document images shown in FIG. 12 consist of the first document image of the B6 size, the second document image of the A5 size, the third document image of the B6 size, and the fourth document image of the A3 size. The orientation of all the document images shown in FIG. 12 is portrait.

The size of the first document image is B6. No document image is laid out on the first sheet of paper in the beginning. The entire area of the first sheet of paper is thus the unassigned area. Therefore, the first document image is laid out in this area of the paper. The image-processing unit 107 tries to lay it out as closely as possible to the leftward and upward edges of the area. As a result, the unassigned area of the first sheet of paper becomes the area left by subtracting the area where the first document image of the B6 size is laid out from the entire areas of the A3 size paper.

The size of the second document image is A5. Since the second document image can be laid out in the unassigned area of the first sheet of paper, it is laid out on the unassigned area. As a result, the unassigned area of the first sheet becomes the area obtained by subtracting the area where the first document image of the B6 size and the second document image of the A5 size are laid out from the entire area of the A3 size paper.

The size of the third document image is B6. The third document image can be laid out in the uncovered area of the first sheet of paper. Therefore, the third document image is laid out in this unassigned area. As a result, the unassigned area of the first sheet becomes the area obtained by subtracting the area where the first document image of the B6 size, the second document image of the A5 size, and the third document image of the B6 size are laid out from the entire area of the A3 size paper.

The size of the fourth document image is A3. The fourth document image cannot be printed within the unassigned area of the first sheet of paper. Therefore the fourth document image is laid out in another area of paper, i.e., the area of the second sheet of paper. Thus, the preparation of the new image data is completed. As a result, the first, second and third document images are laid out on the first sheet of paper. In other words, the first, second and third document images are synthesized to form a new single page of output image data.

Moreover, the digital copying machine 100 according to the present embodiment can provide the following finishing processes.

Figure 13:
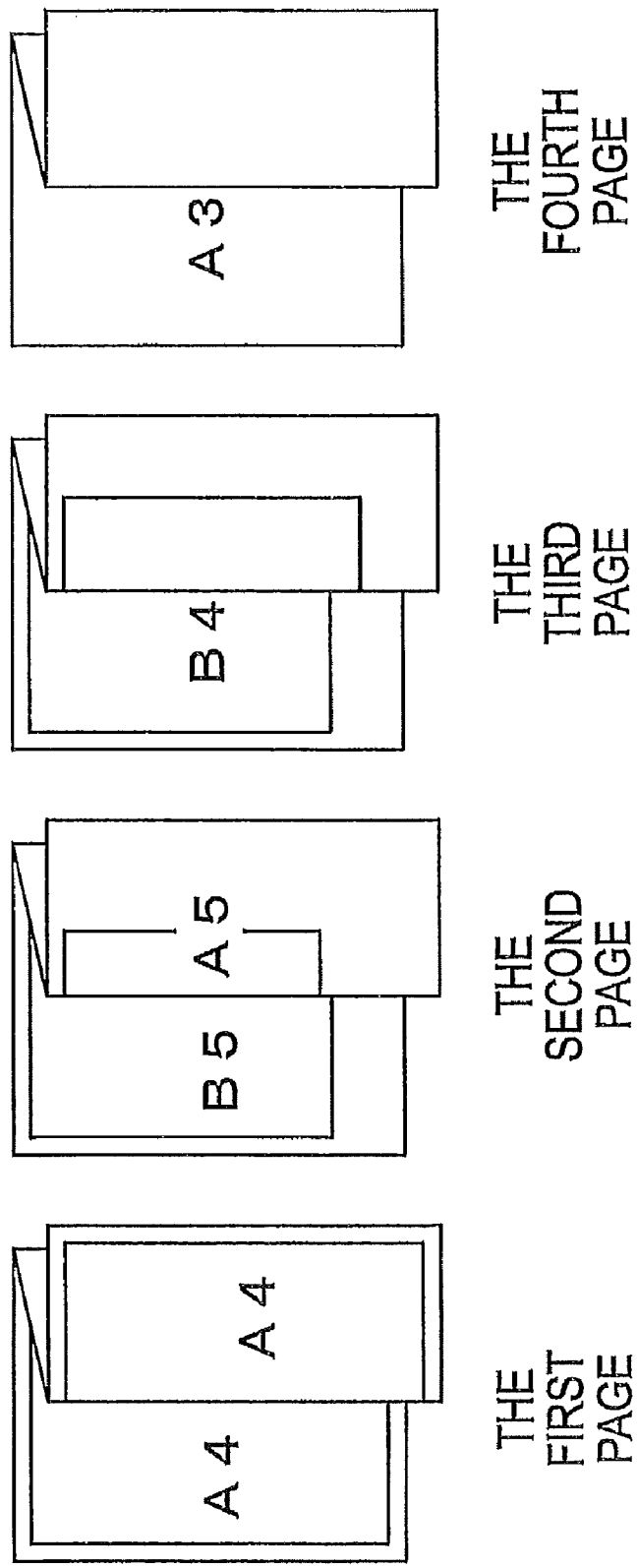
FIG. 13 is a drawing showing a Z-folded printed matter.

FIG. 13 is a drawing showing a Z-folded printed matter. The Z-folding is a process of folding a printed sheet of paper at the midpoint of the longer side and then folding in the opposite direction. The digital copying machine 100 according to this embodiment can provide the same Z-folding to all sheets, as the output sheet size will be uniform.

Figure 14:
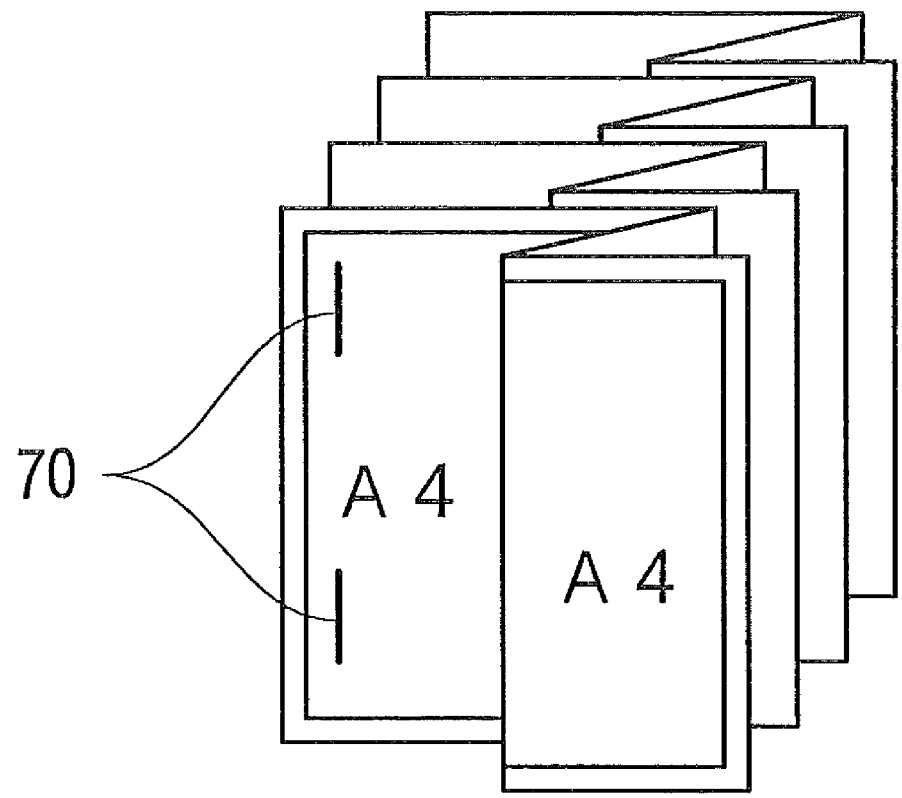
FIG. 14 is a drawing showing a stapled printed matter.

FIG. 14 is a drawing showing a stapled printed matter. The sheets processed with the Z-folding, etc., can be stapled using staples 70 as the last process. The digital copying machine 100 can provide the punching process to the printed sheets, where punched holes are produced on the sheets, instead of the stapling process. As the output sheet size is uniform, stapling and punching can be easily done.

<Printing Process>

Not only when the digital copying machine functions as a copying machine as described above, but also when the digital copying machine functions as a printer, a process similar to the image layout process mentioned above can be executed. More specifically, when the digital copying machine 100 is used as a printer, the image layout process can be executed on either the printer driver of the client 30a through 30d, the print server 30, or the digital copying machine 100. Each of those cases will be described below.

<In Case the Image Layout Process is Executed on the Printer Driver>

In case the image layout process is to be executed on the printer driver, the image layout process is completed at the clients 30a through 30d where the printer drivers are installed.

Figure 16A:
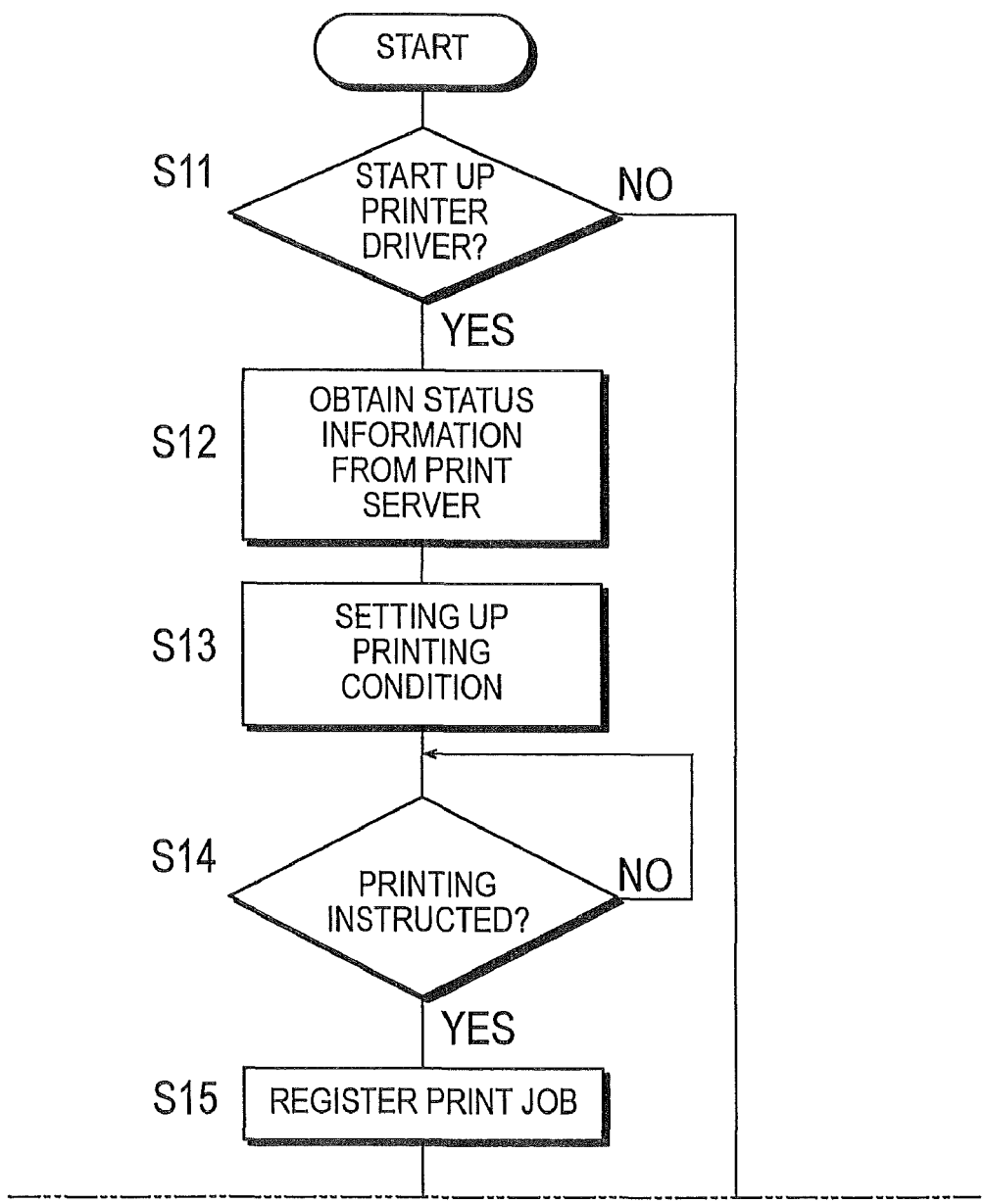
FIG. 16A and FIG. 16B are flowcharts showing the process content of the client in FIG. 1 when an image layout is processed with the print driver.
Figure 16B:
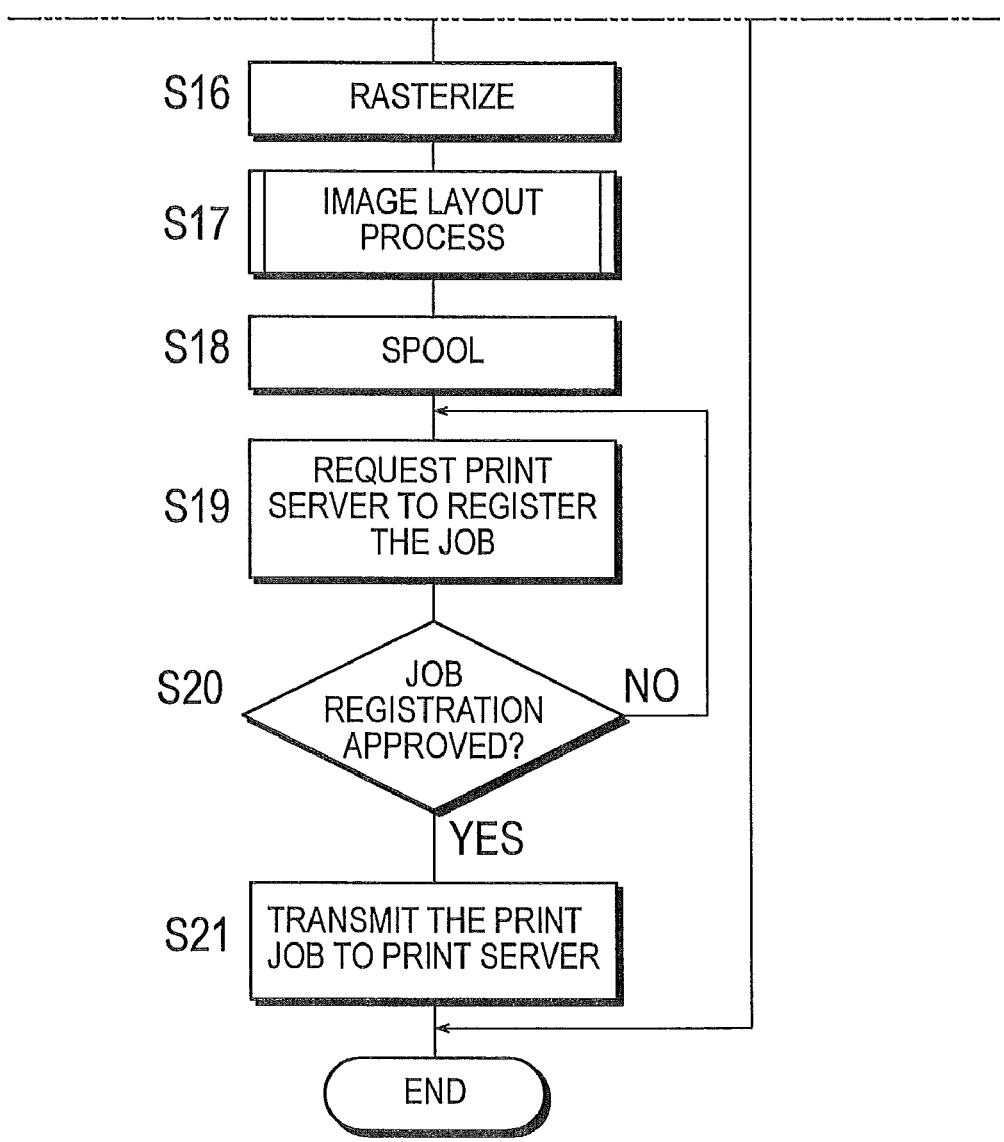

FIG. 15 shows an example of the display screen of the printer driver. FIG. 16A and FIG. 16B are the flowcharts that indicate the operation of the clients 30a through 30d.

Multiple document images of various sizes and/or orientations are prepared by means of the document forming application 33a. After that, as the printer driver's starts up (S11: YES), the status information is obtained from the print server 20 (S12). On the same screen where the printing conditions such as paper size, paper feed port, and double side printing are setup, the N-in-1 mode is also instructed (S13). When the print is instructed (S14: YES), each client 30a~30d prepares a print job, which consists of the document image data and the information of the specified print condition. The prepared print job will be registered to the job control table on the memory 32 (RAM) or on the hard disk 33 (S15). The document image data is stored on the image memory part 16a similar to the constitution of FIG. 3. On the other hand, the print condition is stored in the control table within the control data memory part 16b. The image data outputted from the printer driver is normally prepared in the page description language rather than bitmap.

In FIG. 16B that follows, the document image data is rasterized according to the instructed printing condition (S16). Rasterization is a process of developing image data into bitmap data. When the rasterization is completed, each client 30a~30d executes the image layout process shown in FIG. 10 (S17). After that, the rasterized and image layout processed document image data is spooled to the memory 22 or the hard disk 23 (S18). Each client 30a~30d demands the registration of the print job to the print server 20 and (S19), waits for the print server 20 to approve the registration of the print job (S20: YES), and transmits the print job (document image data and the printing condition) to the print server 20 (S21). As a result, the image layout processed image data is transmitted to the digital copying machine 100 via the print server 20. The digital copying machine 100 that functions as a printer, prints out based on the received image data.

<In Case the Image Layout Process is Executed on the Print Server>

In case the print server executes the image layout process, the image layout process is completed on the print server based on the document image data received from the client.

Figure 17:
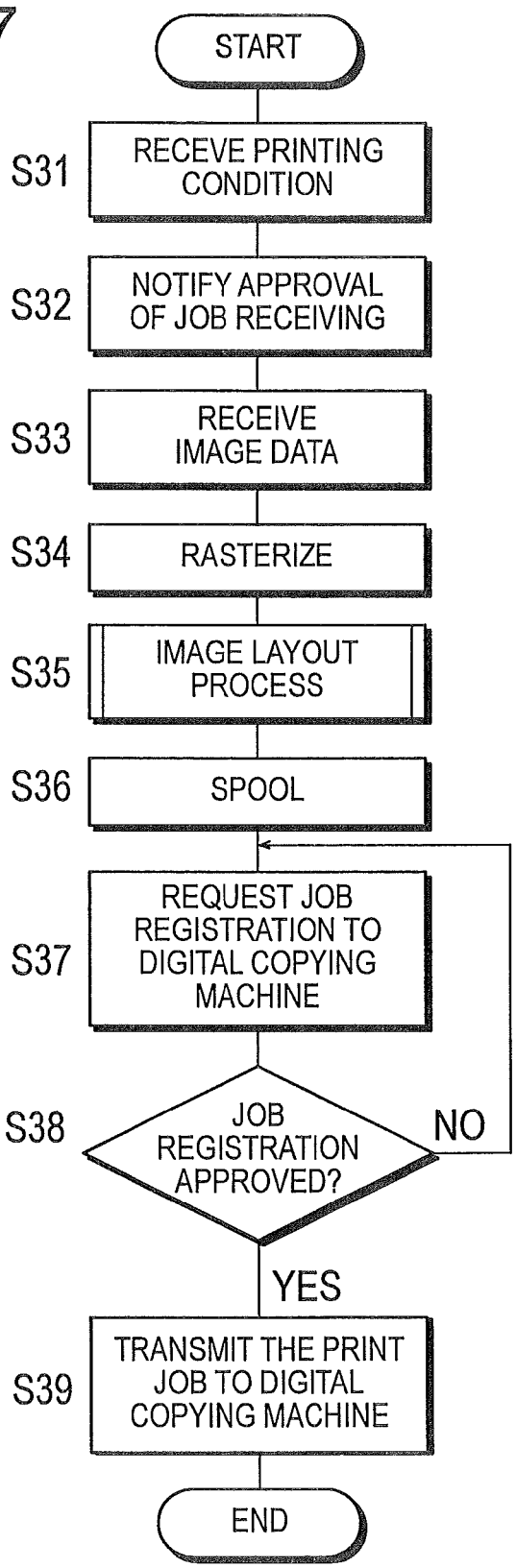
FIG. 17 is a flowchart showing the process content of the print server shown in FIG. 1 when an image layout is processed in the print server.

FIG. 17 is a flowchart showing the operation of the print server 20 in case the print server 20 executes the image layout process. The print server 20 receives the print condition from a certain client 30a~30d (S31). When it judges that the print job is acceptable, the print server 20 notifies the particular client 30a~30d that the print job is acceptable (S32), and receives the document image data from the client 30a~30d.

The document image data received from the client 30a~30d is rasterized according to the instructed printing condition (S34). When the rasterization is completed, the print server 20 executes the image layout process shown in FIG. 10A and FIG. 10B (S35). After that, the rasterized and image layout processed document image data is spooled to the memory 22 or the hard disk 23 (S36). The print server 20 requests the digital copying machine 100 to register the printing job (S37). When the digital copying machine 100 approves the printing job registration (S38: YES), and the print job including the spooled document image data is transmitted to the digital copying machine 100 (S39).

<In Case the Image Layout Process is Executed on the Digital Copying Machine>

In case the digital copying machine executes the image layout process, the image layout process is done at the digital copying machine that actually prints on the paper.

Figure 18:
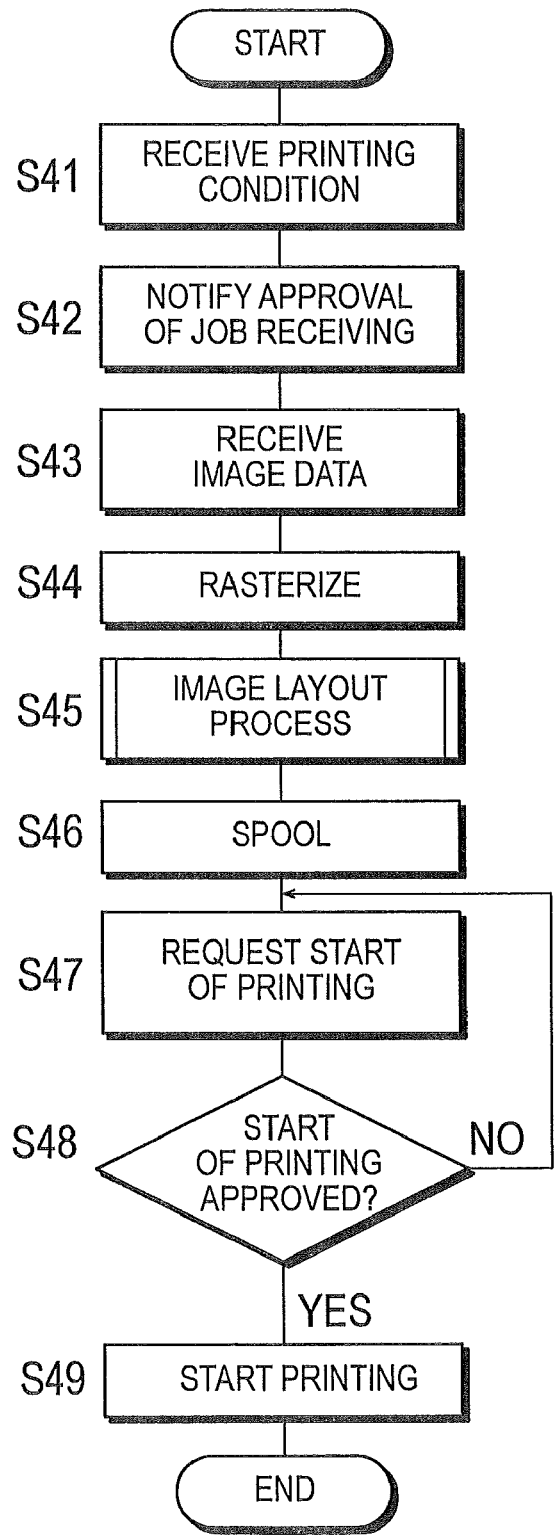
FIG. 18 is a flowchart showing the process content of the digital copying machine shown in FIG. 1 when an image layout is processed in the digital copying machine.

FIG. 18 is the flowchart that shows the operation of the digital copying machine 100 when the image layout process is done by the digital copying machine 100.

The digital copying machine 100 receives the printing condition from the print server 20 (S41). If the print job is judged acceptable, the digital copying machine notifies the print server 20 that the acceptance of the print job is approved (S42), and receives the document image data from the print server 20 (S43). It is recognized that multiple document images of various sizes and/or orientations exist to be printed based on the received document image data.

The document image data is rasterized according to the specified printing condition (S44). When the rasterization is completed, the digital copying machine 100 executes the image layout process shown in FIG. 10 (S45). After that, the rasterized and image layout processed document image will be spooled to the memory 106.

It requests the start of printing internally or to the user and enters into the standby condition waiting for the printing to start (S47). As soon as the printing start is approved (S48: YES), the digital copying machine 100 starts to print (S49).

Although it was assumed that the single side printing is instructed as a part of the copying condition or the printing condition in the above descriptions, the image processing method of this embodiment can be applied to cases where the double sided printing is instructed as a part of either the copying condition or the printing condition. In case the double sided printing is instructed, document images are laid out in the areas that correspond to the front and rear sides respectively. More specifically, the unassigned area is identified for the front area where document images are not laid out yet to determine if a new document image can be laid out in the unassigned area. If the new document image can be laid out in the unassigned area, the document image will be laid out in the unassigned area. On the other hand, if the new document image cannot be laid out in the unassigned area, the document image will be laid out in the area of the backside of the paper.

The process in this embodiment is applicable not just to document images of various sizes and/or orientations. In such a case, it is not different from the conventional N-in-1 printing in so far as generating the output image data by means of synthesizing multiple document images. However, in the conventional N-in-1 printing, the area on the printing paper is divided into equal parts and only one document image is laid out in each equally sized part. On the centrally, the image processing method according to this embodiment identifies the unassigned area, which is the area on the paper not laid out with document images, and makes a judgment whether any documents can be laid out in the unassigned area, so that it is possible to freely lay out and print document images without depending on any prescribed formats such as equal divisions of the area of the paper.

Furthermore, as described above, there is no need to preset the number of document images on a sheet of paper as in the case of the conventional N-in-1 printing, and the number of document images laid out on a sheet of paper is automatically determined, so that a layout can be made to maximize the number of document images per sheet of paper automatically. As a result, the chance of optimizing the use of the area of paper is greater compared to the convention N-in-1 printing.

According to this embodiment, document images are laid out after comparing each selected document image one by one with the unassigned area, which is the area of the sheet of paper not laid out with document images, image loss can be prevented even when the N-in-1 printing is executed with multiple document images of various sizes and/or orientations. It also makes the output paper size uniform, thus making the finishing processes such as paper folding process and punching process easier to execute. Moreover, since all the document images can be scaled up or down with a common scaling factor, so that it makes the character font sizes uniform and printed materials easier to read. This makes it different from the "fit to paper" processing that scales up or down each document image of a different size to fit the uniform paper size.

Second Embodiment

In the image processing of the second embodiment, the size of the largest document image is detected among multiple document images, and the scaling factor is calculated to match the size of the largest document with the size of the standard print area. Once it is determined, all the document images are scaled up or down based on the calculated scaling factor. The standard print area mentioned above can be the entire area of a sheet of paper or alternatively one of the equally divided areas of the sheet.

The second embodiment is different from the first embodiment in the contents of the image layout process. It is however the same as the first embodiment in all other points. Its components that function the same as those in the first embodiment are assigned with the same component numbers. This embodiment is applicable not only to the N-in-1 printing but also in the conventional printing where only one document image is laid out in one sheet of paper.

The contents of the image layout process unique to the second embodiment are described below. The following description is based on, for example, a case where the document image is reduced and the reduced document image is laid out in the area. According to the document image layout process in this embodiment, the size of the largest document image identified among the multiple document images to be printed is compared with the standard print area. The common scaling factor is calculated based on the comparison in such a way that the largest document fits within the standard print area. More specifically, if the entire area of a sheet of paper is selected as the standard print area, the scaling factor used commonly for all the documents to be printed is calculated in such a way that the largest document image fits within the area of the sheet of paper. If the equally divided area is selected as the standard print area, the common scaling factor is calculated in such a way that the largest document image fits within the equally divided area.

<In Case the N-in-1 Printing is Not Executed>

Figure 19:
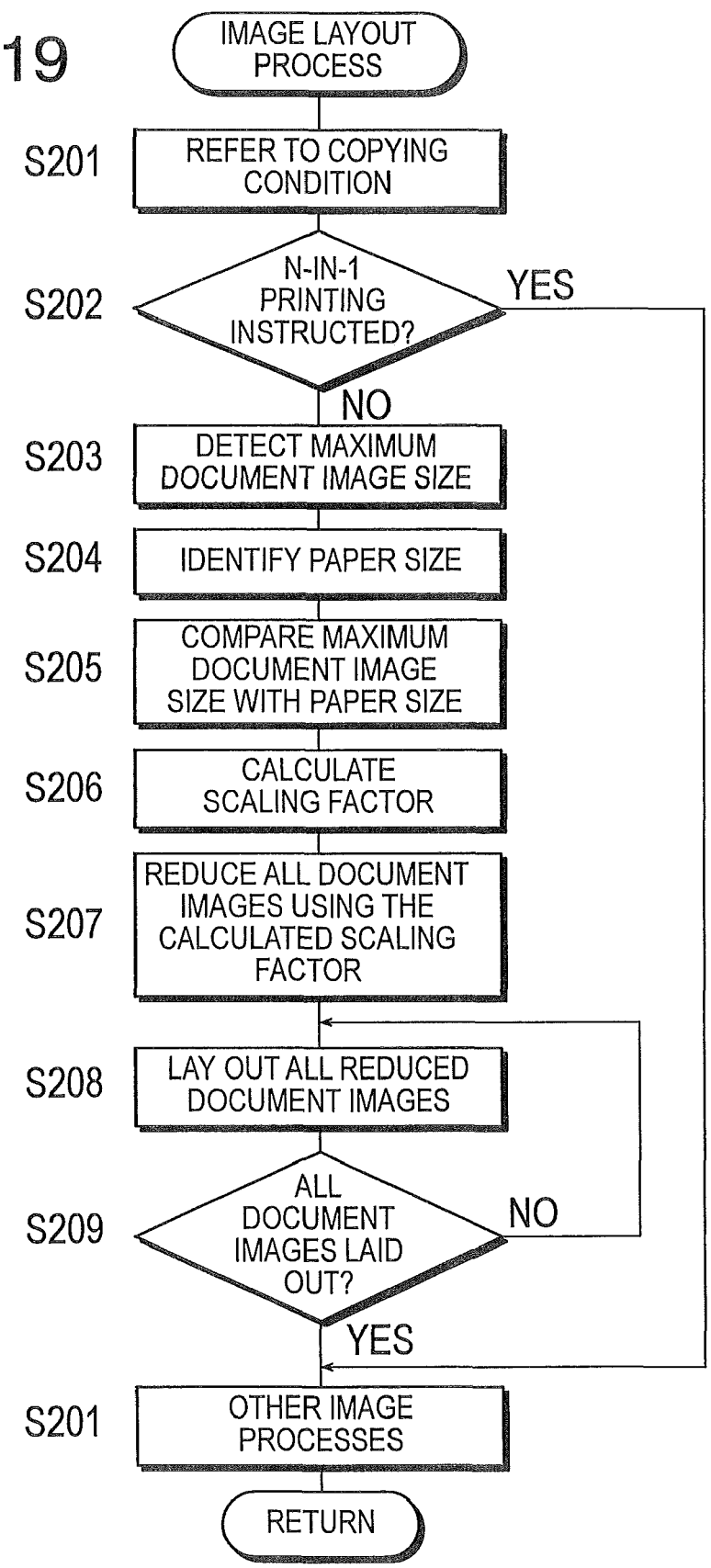
FIG. 19 is a flowchart showing an example of image layout process corresponding to the second embodiment of the present invention.

FIG. 19 is a flowchart that shows an example of the image layout process that corresponds to the second embodiment of the invention. FIG. 19 shows the process of a case where the N-in-1 printing is not instructed. The image layout process for this embodiment can be executed on the memory 106 as in the case of the first embodiment.

The CPU 109 refers to the copying condition stored in the control data memory part 16b (S201). If it is judged that the N-in-1 printing is not instructed as a result of the reference (S202: NO), it is processed as follows.

The size of the largest document image is detected among the document images to be printed (S203). For example, the value of the largest document image size is searched from the data file of the size of each document image stored in the control data memory part 16b as a detection result of the document status detection sensor 103. As a result of the search, the maximum document image size is detected. If the document status detection sensor 103 itself is capable of detecting the maximum document size from multiple documents, the maximum document image size can be detected using its output. For example, if the ADF 102 is transporting multiple documents, the maximum document size can be detected by adding an area sensor, etc., to the ADF 102. According to this method, it becomes possible to detect the maximum document size before all the documents are scanned so that the process can be speeded up.

The size of the paper is identified by referring to the data concerning the paper size stored n the control data memory part 16b as a condition of copying (S204). As a result, the size of the area of a sheet of paper is set up. If the N-in-1 printing is not instructed, the entire area of the sheet of paper is always the standard print area. If the paper size instruction is not included in the copying condition, the size of the document, which is scanned first, can be set up as the paper size.

The maximum image size identified is then compares with the size of the entire area of the paper (i.e., the standard print are in this case) (S205). The common scaling factor will be calculated based on the comparison (S206). More specifically, the scaling factor is calculated so that the size of the maximum document image becomes equal or smaller than the size of the entire area of the paper. For example, if the maximum document image size is the A3 size and the paper size is the A4 size, the scaling factor used commonly for all the document images is set to 0.707 or smaller. In order to prevent the character fonts becoming too small to be legible, it is preferable for the CPU 109 to calculate the scaling factor in such a way as to make the maximum document image size equal to the size of the entire area of the paper.

The image-processing unit 107 reduces all the document images based on the common scaling factor calculated as above (S207). In case of the processing example shown in FIG. 19, only one of the reduced document images is laid out on each sheet of paper (S208). It then checks whether all the document images are laid out (S209). When all the document images are laid out (S209: YES), other image processes such as spacing are executed to complete the image layout process (S110).

Figure 20:
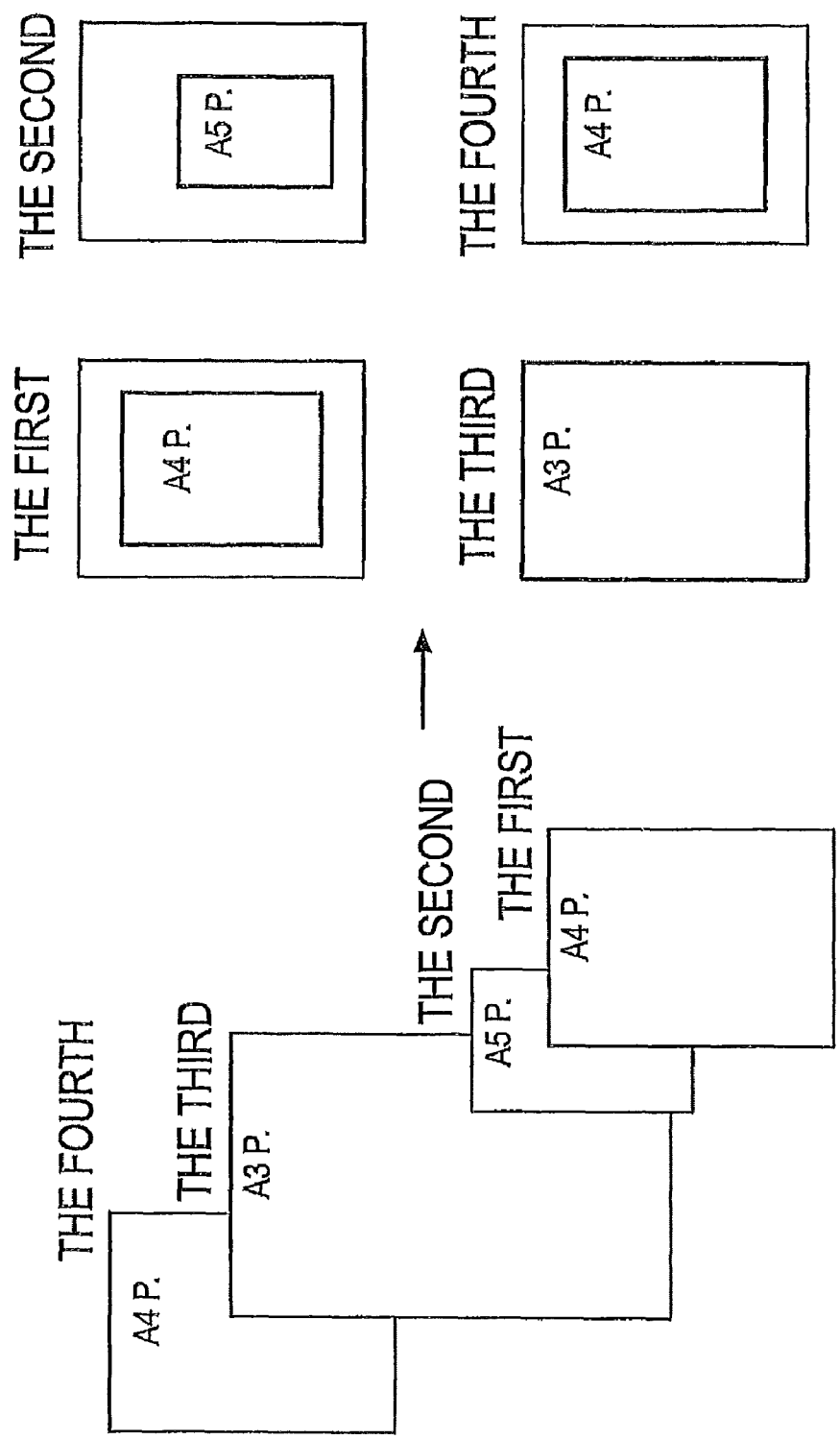
FIG. 20 is a drawing showing an example of image layout based on the process shown in FIG. 19.

FIG. 20 shows an example layout based on the process shown in FIG. 19. FIG. 20 shows the process of laying out the document images on paper of the A4 size in portrait orientation. Multiple document images shown in FIG. 20 consist of the first document image of the A4 size, the second document image of the A5 size, the third document image of the A3 size, and the fourth document image of the A4 size. The orientation of all the documents shown in FIG. 20 is portrait.

First, it is detected that the size of the largest document image among the document images to be printed is the A3 size based on the output of the document status detection sensor 103. The size of the detected largest document image is compared with the size of the entire area of the paper (i.e., the size of the standard print area in this case). The scaling factor is calculated in such a way that the size of the third document image, which is the largest document image and is the A3 size, becomes the paper size, i.e., the A4 size. Consequently, the common scaling factor is determined as 0.707. The image-processing unit 107 reduces all the document images consisting of the first, second, third and fourth document images based on the calculated scaling factor 0.707. Each reduced document image is laid out on a sheet of paper by itself.

<In Case the N-in-1 Printing is Allowed and the Standard Print Area is the Same as the Entire Area of the Paper>

Figure 21A:
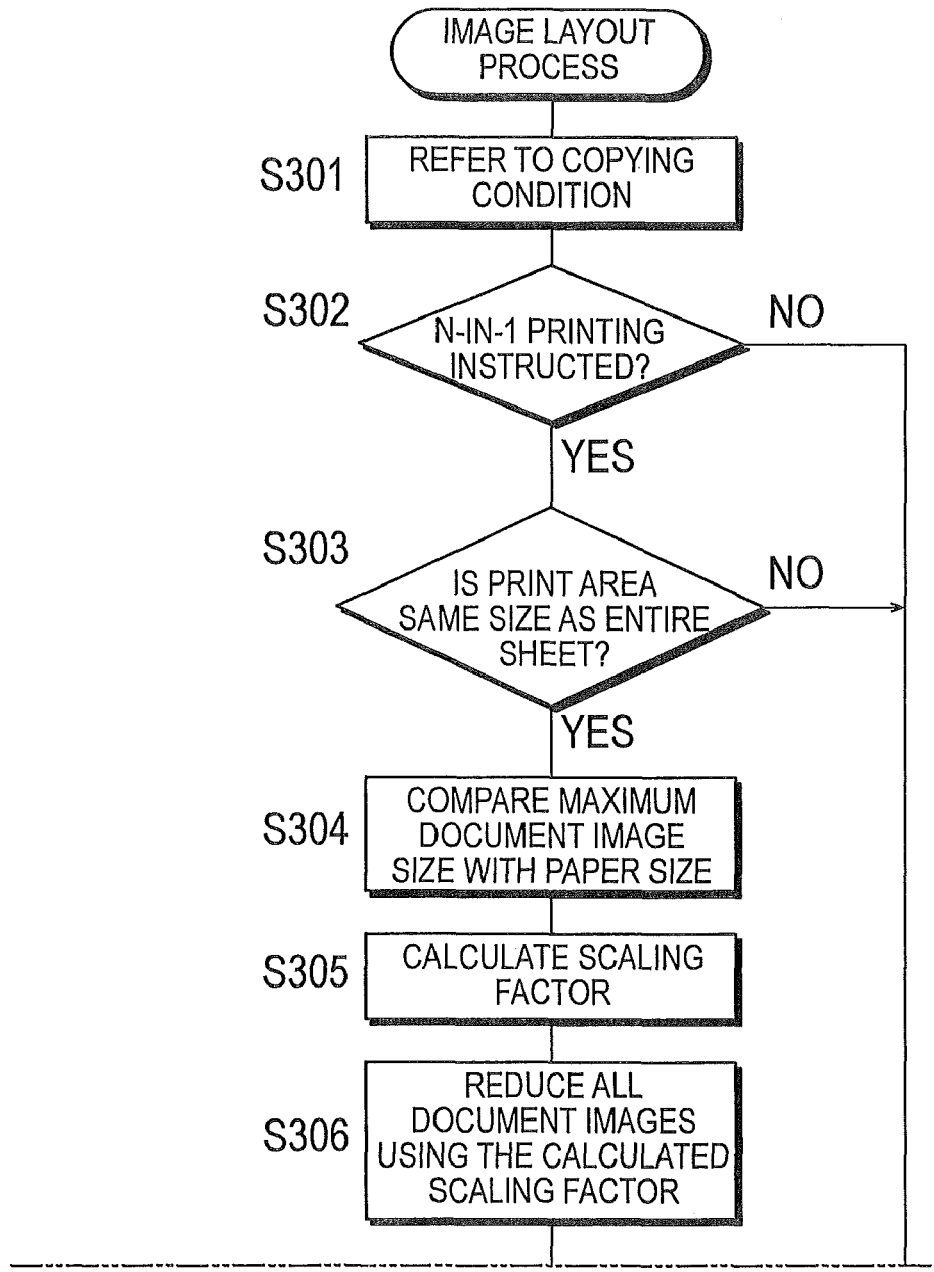
FIG. 21A and FIG. 21B are another example of image layout process corresponding to the second embodiment of the present invention.
Figure 21B:
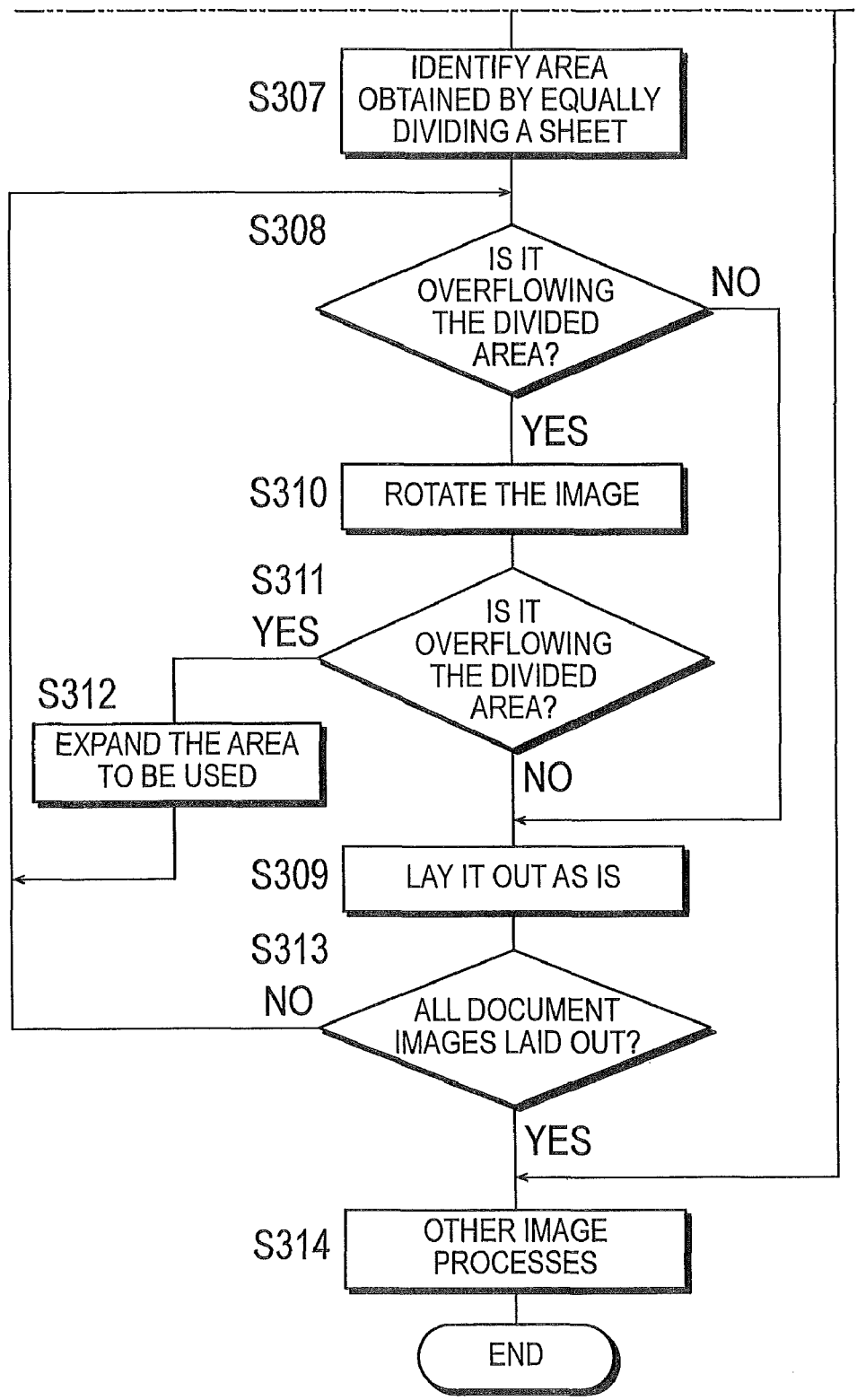

FIG. 21A and FIG. 21B show a flowchart for another example of the document image layout process corresponding to the second embodiment of the invention. FIG. 21A and FIG. 21B represent a case where the N-in-1 printing is specified and the print area is the same as the entire area of the paper. According to the process shown in FIG. 21A and FIG. 21B, the scaling factor is calculated the same way as in the process shown in FIG. 19. Moreover, the process shown in FIG. 21A and FIG. 21B is different from the process shown in FIG. 19 in that it does not limit the number of document images to one, but rather allows multiple document images on a sheet of paper.

The CPU 109 refers to the copying condition stored in the control data memory part 16b (S301). If it is judged that the execution of the N-in-1 printing is instructed as a result of the reference (S302: YES), and the standard print area is specified as the entire area of a single sheet of paper (S303: YES), it is processed as follows.

The size of the largest document image is detected among the document images to be printed similar to the case shown in FIG. 19 and the detected size of the largest document image is compared with the size of the entire area of the paper (i.e., the standard print area in this case) (S304). The scaling factor will be calculated based on the result of the comparison in such a way that the size of the maximum document image becomes equal or smaller than the size of the entire area of the paper. More preferably, the scaling factor is calculated in such a way as to make the maximum document image size equal to the size of the entire area of the paper (S305).

The image-processing unit 107 reduces all the document images based on the calculated scaling factor (S306). The reduced document images are laid out according to the following process.

The image-processing unit 107 identifies the area of a sheet of paper dividing it into multiply areas (subdivisions) as indicated in FIG. 21B (S307).

FIG. 22 shows an example of equally dividing the area of the sheet. In FIG. 22, the area 1a of a sheet of paper is divided into two equal parts, subdivisions 2a and 2b, at the midpoint of the longer side. The subdivision 2a is further divided into two equal parts, subdivisions 4a and 4b, at the midpoint of its longer side. The subdivision 2b is further divided into two equal parts, subdivisions 4c and 4d, at the midpoint of its longer side. As a result, the area 1a is divided into four equal parts 4a, 4b, 4c and 4d.

It is then judged if each of the reduced documents can fit into one of the subdivisions. It is tried to put each reduced document image into as smaller subdivision (subdivision of a larger dividing number) as possible. However, it is possible to preset the maximum division number M in the copying condition. For example, in case the maximum division number M=2 is preset, even if a reduced document image can be laid out into a subdivision obtained by dividing the area 1A into four, it is still laid out into a subdivision obtained by dividing it into two.

The process of laying out the reduced document images is described in the steps following the step S308 in the flowchart shown in FIG. 21B. Here, it is assumed that the maximum division number is four.

When a reduced document image is to be laid out in a quadrant area, which is the minimum unit, it is judged whether the document image will overflow the boundary of a quadrant area (S308). If the reduced document image does not overflow the quadrant area (S308: NO), the document is laid out in the quadrant area maintaining the original orientation without being rotated (S309). If the reduced document image overflows the boundary of the quadrant area (S308: YES), the document image is rotated 90 degrees to change the orientation (S310). It is then judged if the 90 degrees rotation prevents it from extending beyond the boundary of the quadrant area (S311). If the document image does not overflow the boundary of the quadrant area (S311: NO), the document image is laid out in the quadrant area (S309). On the other hand, if the document image still overflows the boundary of the quadrant area even after the rotation (S311: YES), the area used for the document image is expanded (S312). More specifically, the area used for laying out the document image is expanded from a quadrant area to a bisection area. If the document image cannot be laid out in a bisection area, the document image will be laid out using the entire area of the paper.

When all the document images are laid out (S313: YES), other image processes, such as spacing, will be executed (S314) to complete the image layout process.

Figure 23:
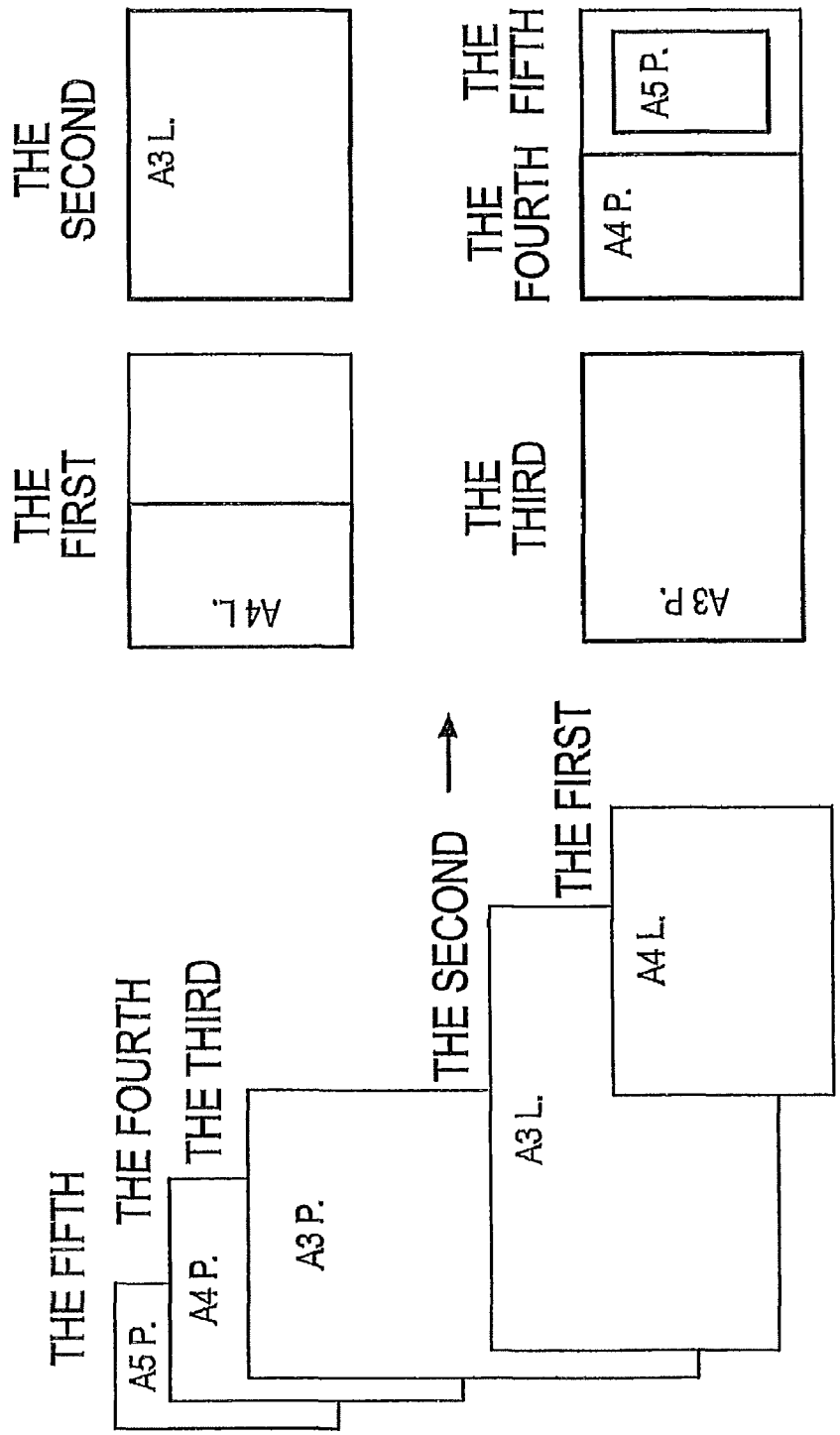
FIG. 23 is a diagram showing layout examples based on FIG. 21A and FIG. 21B.

FIG. 23 shows an example of the layout based on the process shown in FIG. 21A and FIG. 21B. The example shown in FIG. 23 is a case where documents are laid out in the A4 size sheet in the landscape orientation. Actual process is executed on the memory 106. The document images shown in FIG. 23 consist of the first document image of the A4 size in the landscape orientation, the second document image of the A3 size in the landscape orientation, the third document image of the A3 size in the portrait orientation, the fourth document image of the A4 size in the portrait orientation, and the fifth document image of the A5 size in the portrait position. FIG. 23 shows a case where the maximum division number is two.

First, it is detected that the size of the largest document image among the document images to be printed is the A3 size based on the output of the document status detection sensor 103. The size of the detected largest document image is compared with the size of the entire area of the paper (i.e., the size of the standard print area in this case). The scaling factor is calculated in such a way that the size of the largest document image, which is the A3 size, becomes the paper size, i.e., the A4 size.

The image-processing unit 107 reduces all the document images based on the calculated scaling factor 0.707. The size of the reduced first document image is A5. Therefore, the first document image is rotated 90 degrees and laid out into a bisection area. The size of the reduced second document image is A4. Therefore, the second document image does not fit into the bisection area adjacent to the area where the first document image is laid out. As a consequence, the reduced second document is laid out into the area of the second sheet of paper. The size of the reduced third document image is A4. The reduced third document image is rotated 90 degrees relative to the area of the sheet. As a result, the reduced third document image is laid out in the third sheet of paper. The size of the reduced fourth document image is A5. Therefore, the reduced fourth document image is laid out into the bisected area of the fourth sheet of paper. The size of the reduced fifth document image is A6. Therefore, the reduced fifth document image can be fit into the adjacent quadrant area by rotating it. However, since the maximum division number M=2, no layout for the quadrant area will be considered. Therefore, the reduced fifth document image is laid out into the bisection area adjacent to the area where the fourth document image is laid out.

<In Case the N-in-1 Printing is Allowed and the Standard Print Area is an Area Obtained by Equally Dividing the Paper>

Figure 24A:
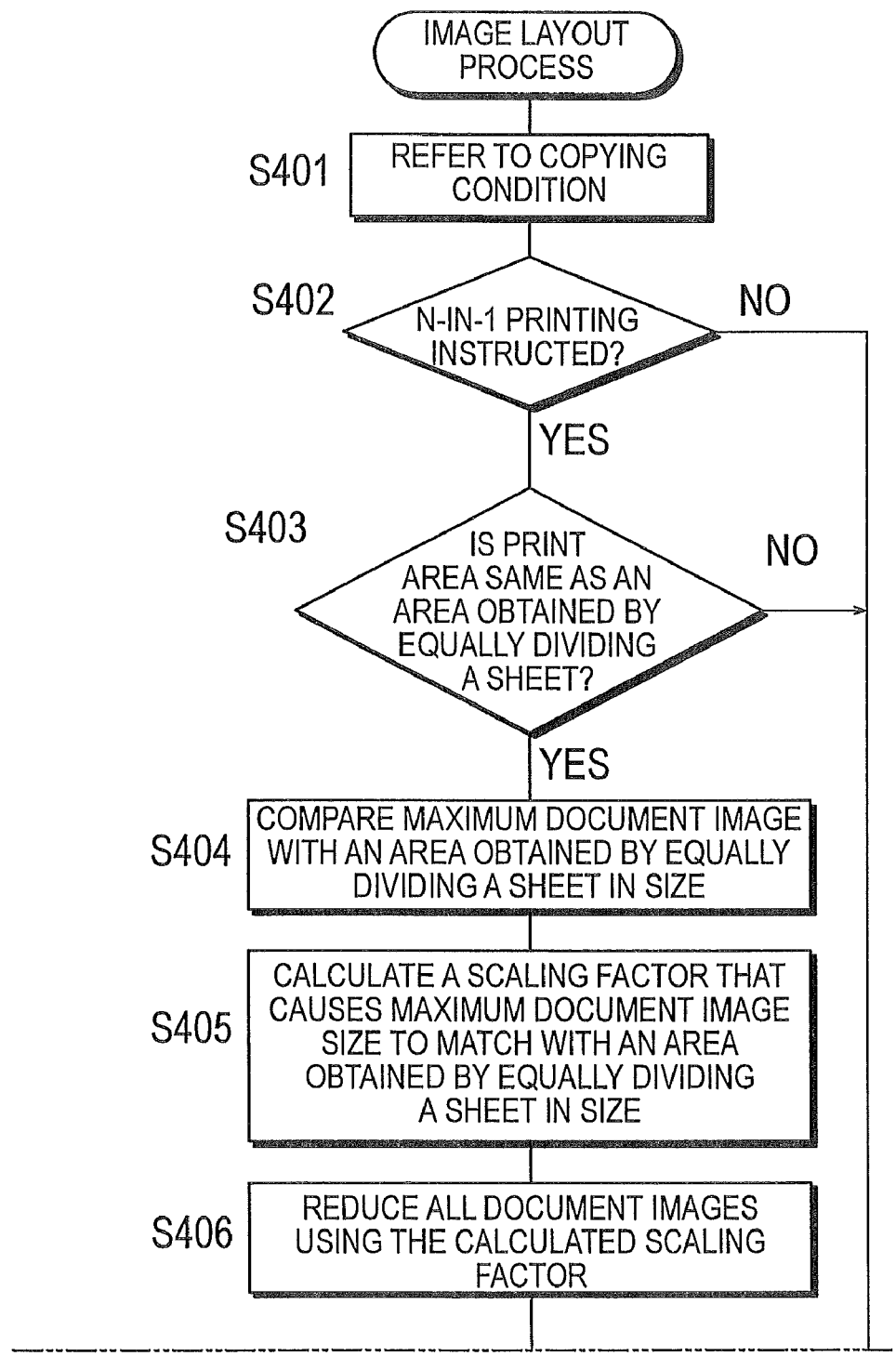
FIG. 24A and FIG. 24B are flowcharts showing yet another example of image layout process corresponding to the second embodiment of the present invention.
Figure 24B:
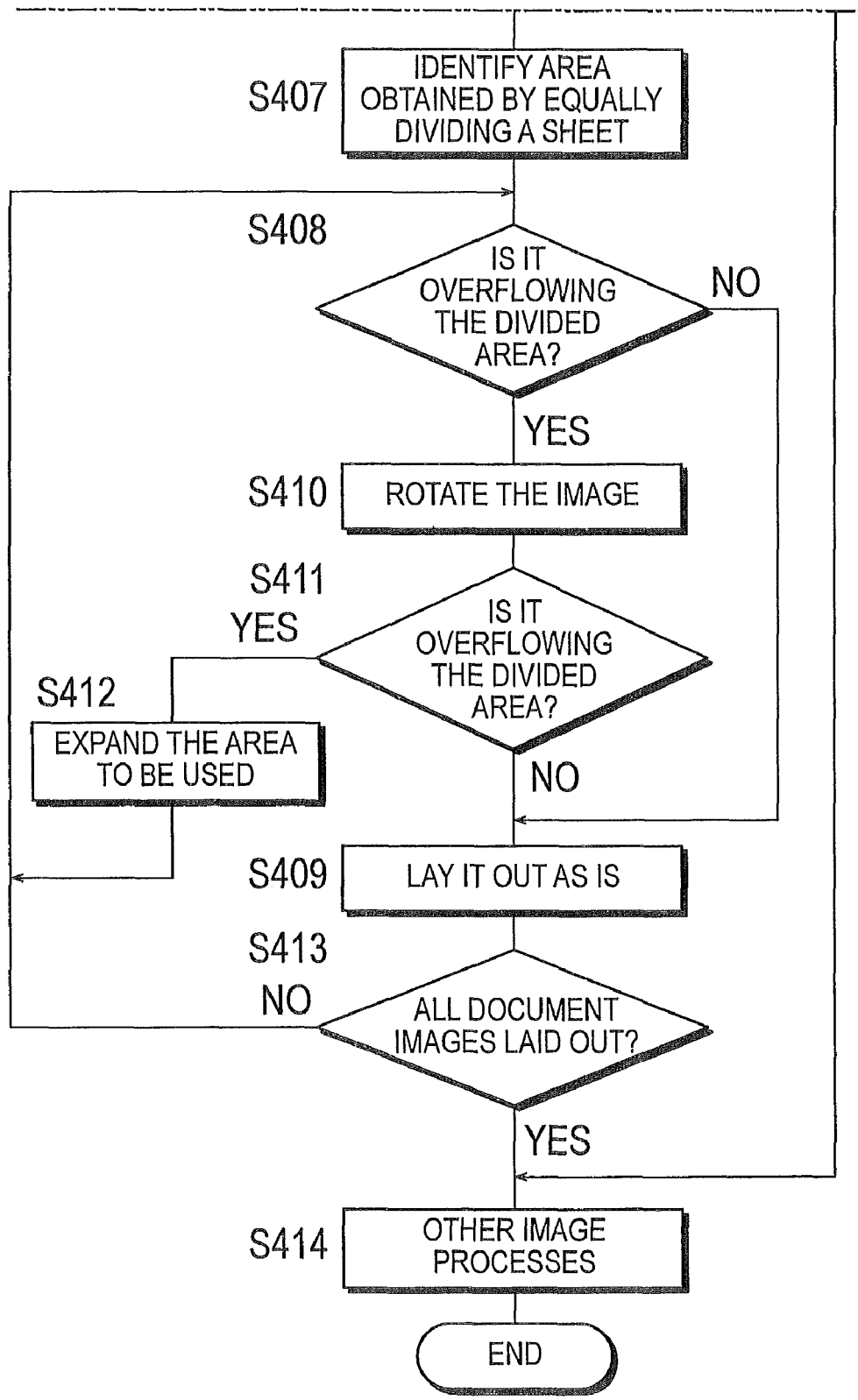

FIG. 24A and FIG. 24B show a flowchart for another example of the image layout processing corresponding to the second embodiment of the invention. FIG. 24A and FIG. 24B show a case where the N-in-1 printing is specified and the standard print area is one of areas obtained by equally dividing the paper. The process shown in FIG. 24A and FIG. 24B always prepare output document image data for printing out multiple document images on a single sheet of paper.

CPU 109 refers to the copying condition stored in the control data memory part 16b (S401). If it is judged that the execution of the N-in-1 printing is instructed as a result of the reference (S402: YES), and an area obtained by equally dividing a sheet of paper is specified as the standard print area (S403: YES), it is processed as follows.

The size of the largest document image is detected among the document images and the detected size of the largest document image is compared with the size of the divided area of the paper (i.e., the standard print area in this case) (S404). The scaling factor will be calculated based on the result of the comparison in such a way that the size of the maximum document image becomes equal or smaller than the size of one of the divided area of the paper. More preferably, the scaling factor is calculated in such a way as to make the maximum document image size equal to the size of one of the divided area of the paper (S405). The image-processing unit 107 reduces all the document images based on the calculated scaling factor (S406).

The reduced document images are laid out according to the process shown in FIG. 24B. The process shown in FIG. 24B is similar to the process shown in FIG. 21B. The image-processing unit 107 identifies the area of a sheet of paper dividing it into multiply areas (S407). If a document image selected from the reduced document image fits into a specific divided area (S408: NO, or S411: NO), the document is laid out into the divided area (S409). If the reduced document image does not fit into the specific divided area (S411: YES) even after rotating the document image (S410), the area used for the document image is expanded (S412). Multiple document images to be laid out are laid out adjacent to each other as much as possible. Similar process is repeated. When all document images are laid out (S43: YES), other image processes are executed (S414) to complete the image layout process.

Figure 25:
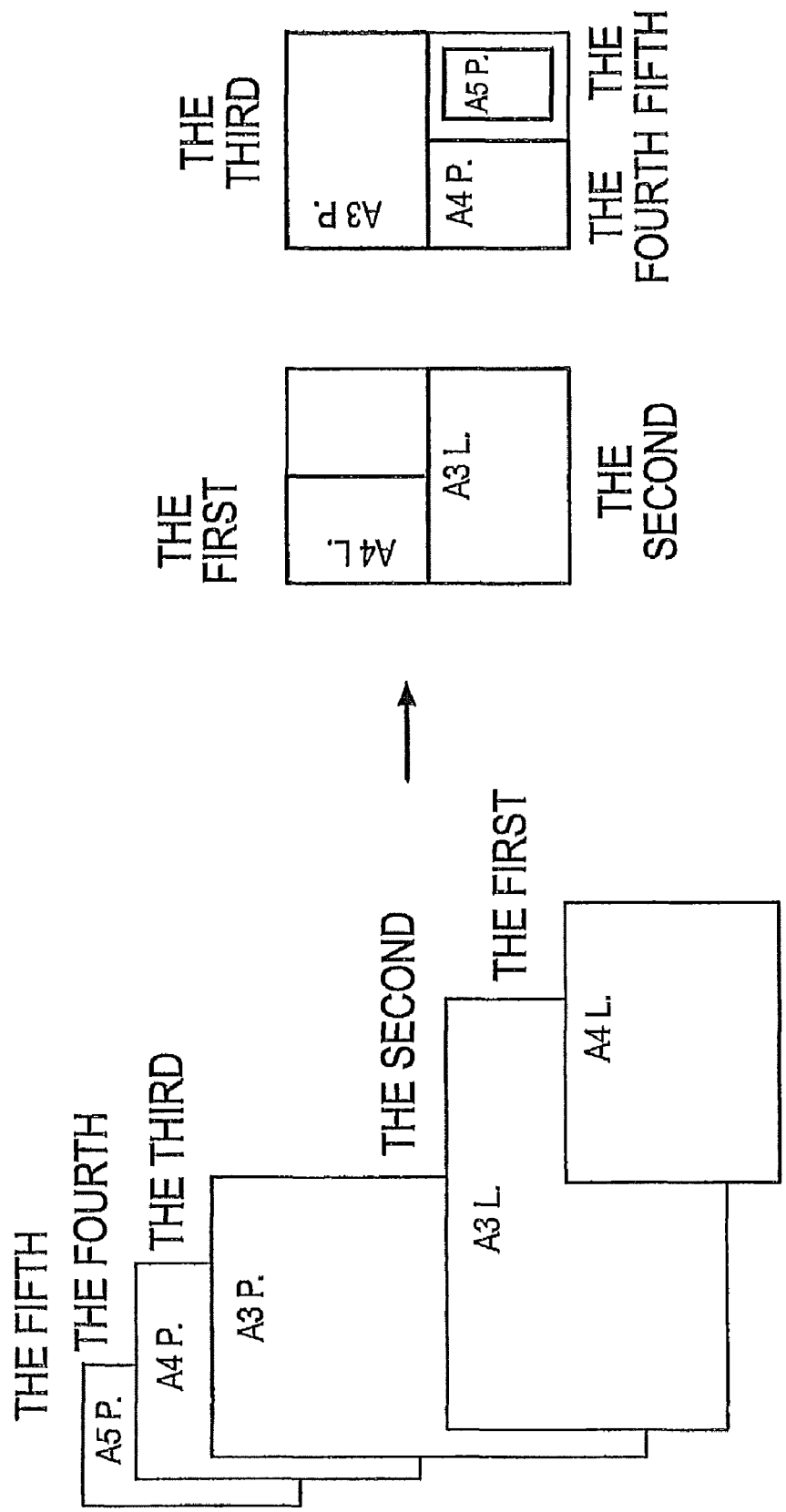
FIG. 25 is a diagram showing an example of image layout based on the process shown in FIG. 24A and FIG. 24B.

FIG. 25 shows an example layout based on the process shown in FIG. 24A and FIG. 24B. FIG. 25 shows an example where document images are laid out on A4 size paper in the portrait orientation. The process is executed on the memory 106. The document images shown in FIG. 25 consist of the first document image of the A4 size in the landscape orientation, the second document image of the A3 size in the landscape orientation, the third document image of the A3 size in the portrait orientation, the fourth document image of the A4 size in the portrait orientation, and the fifth document image of the A5 size in the portrait position. FIG. 23 shows a case where an area obtained by bisecting the sheet of paper into two equal parts is assigned as the standard print area.

First, it is detected that the size of the largest document image among the document images to be printed is the A3 size based on the output of the document status detection sensor 103. The size of the largest document image detected is compared with the size of the area obtained by dividing the paper into two equal parts. The scaling factor is calculated in such a way as to make the size of the largest document image (i.e., A3) to be the A5 size (i.e., the size of the area obtained by dividing the A4 size paper into two equal parts). Therefore, the scaling factor becomes 0.5.

The image-processing unit 107 reduces the entire document images based on the calculated scaling factor 0.5. The size of the reduced first document image is A6. Therefore, the first document image is rotated and laid out into a quadrant area. The size of the reduced second document image is A5. Therefore, the reduced second document image does not fit into the quadrant area. As a result, the area to be used for layout is expanded from a quadrant area to a bisection area. The reduced second document is laid out in a bisection area. The size of the reduced third document is A5. Therefore, the reduced third document image is rotated and laid out in a bisection area. The size of the reduced fourth document image is A6. Therefore, the reduced fourth document image is laid out in the quadrant area adjacent to the third document image. The size of the reduced fifth document is A7. Therefore, the reduced fifth document image can fit into an octant area. However, since the maximum division number M=4, the layout to an octant area is not considered. Therefore, the fifth document image is laid out into a quadrant area adjacent to the fourth document image.

If the digital copying machine described above is used as a printer, processes similar to the image layout processes described above can be executed. This point is the same as in the first embodiment. The image layout processes can be executed on either the printer drivers of the clients 30a through 30d, the print server 30, or the digital copying machine 100. Since the processes are the same in the processes described referencing FIG. 16A, FIG. 16B, FIG. 17, and FIG. 18 for the first embodiment, the detailed descriptions are not repeated here.

Although the above descriptions were based on the assumption of a single sided printing as a part of the copying or printing condition, the image layout processes of this embodiment apply to cases where the double side printing is specified as well. In such cases, the print areas exist both on the front and back sides of the paper.

The scaling factor is calculated in such a way as to make the size of the largest document size match with the size of the print area, and all the document images are scaled up or down according to the scaling factor. The method of laying out the scaled document images on the areas of the paper are not limited to the processes shown in FIGS. 21A, 21B, 24A and 24B.

For example, it is possible to combine the process of the first embodiment and the process of the second embodiment. Specifically, the size of the largest document image is detected according to the process of the second embodiment. The scaling factor is calculated to make the size of the largest document image match with the size of the print area (for example, the entire area of the paper). All the documents will be scaled up or down based on the calculated scaling factor. The scaled document images are laid out in sequence in the area of the paper according to the process of the first embodiment. In other words, the scaled document images are processed in such a way as to be printed out adjacent to each other. At this point, an area that is not yet assigned with document images, i.e., an unassigned area is identified. It is then judged whether any document image can be laid out in the unassigned area. If it is judged that it is possible to do so as a result of the judgment, as many document images as possible are laid out adjacent to each other.

In the present embodiment, the size of the largest document image is detected among multiple document images, the scaling factor is calculated to make the detected maximum size be the size of the print area, and the multiple document images are scaled up or down based on the calculated scaling factor. Thus, image loss can be prevented and a common scaling factor can be used for the multiple document images. Consequently, the uniformity of the character font size is achieved making the printed materials easier to read. These effects can also be achieved in case the N-in-1 printing is not executed, in other words, one page portion of the document image is printed on one sheet of paper. The process of this embodiment is advantageous compared to the simple "fit-to-paper" process in that the common scaling factor can be used for all the document images.

Third Embodiment

In the third embodiment of the invention, the size of each document image is detected, and a scaling factor is calculated for each document image to make the size of the particular document image to match the size of a print area, which is obtained by equally dividing the paper into a prescribed number of sections. Each document image is then scaled up or down based on the calculated scale factor. The print area in the third embodiment is an area obtained by equally dividing the paper into a prescribed number of sections.

More specifically, the process according to this embodiment executes the N-in-1 printing without requiring a change in the orientation of the document image if the N-in-1 printing is specified and if it is identified that the document images of various sizes are included in the image data. In other words, the scaling factor is calculated in such a way as to fit the particular document in the specified print area without losing any image and without requiring a change in the orientation of the document image. More specifically, the scaling factor for a document image arbitrarily selected from multiple document images is calculated in the following manner. First, the system identifies the length of the longer side of the document image. Next, it identifies the length of the print area parallel to the longer side of the document image, which is to be fitted into the printing area. It then calculates the ratio between the length of the longer side of the selected document image and the above-mentioned length of the print area. It further calculates the scaling factor that causes the selected document image to fit into the print area. It finally lays out each scaled document image into a print area maintaining the original orientation.

The third embodiment is different from the first and the second embodiments in the contents of the document image layout process. However, it is the same as the first embodiment except the contents of the document image layout process. The same component numbers are used for the components identical to those of the first embodiment.

The contents of the image layout process unique to the third embodiment will be described below.

Figure 26:
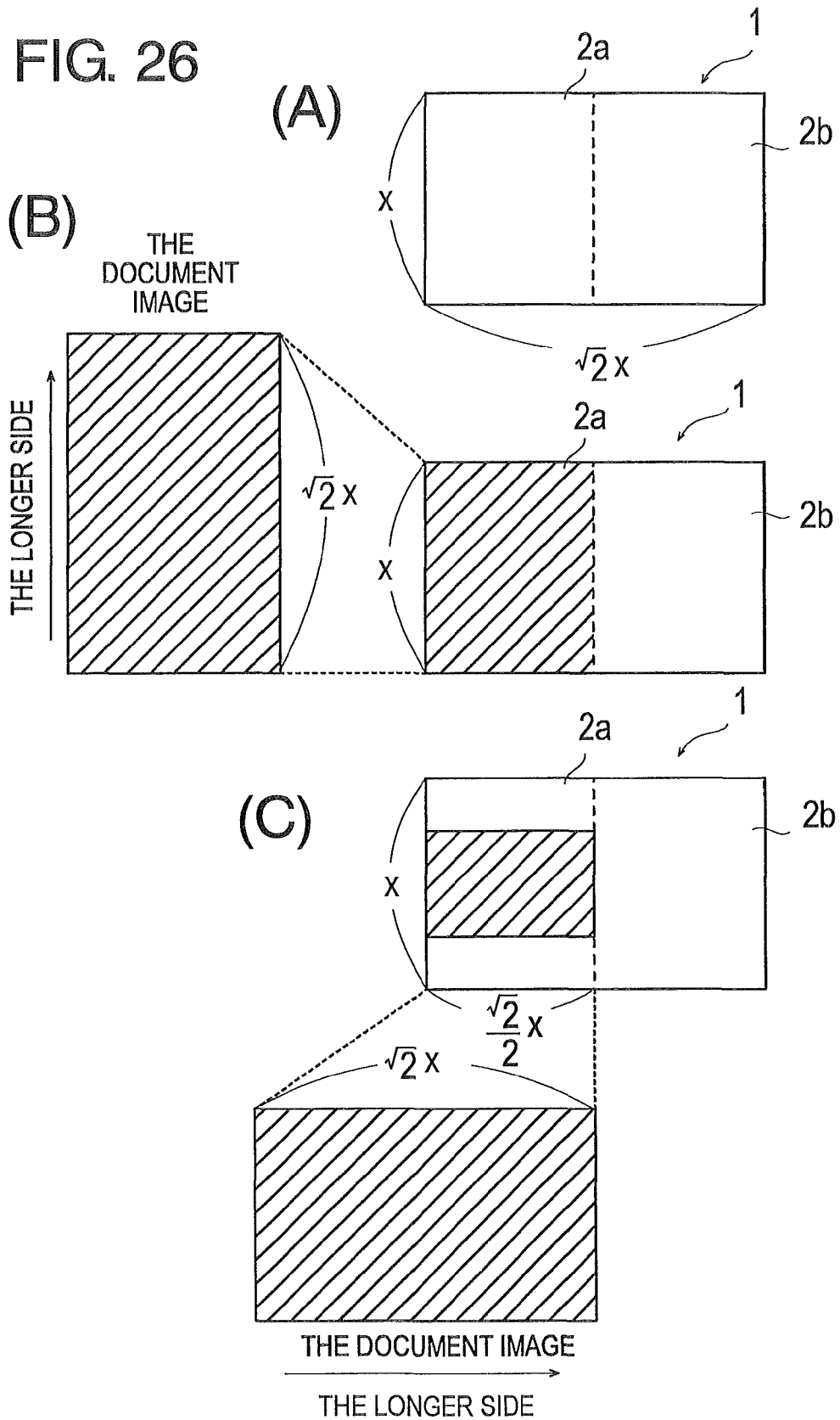
FIG. 26 is a diagram for describing image layout process corresponding to the third embodiment of the present invention.

FIG. 26 shows the process of this embodiment when the 2-in-1 printing is specified. If the 2-in-1 printing is specified, each area obtained by dividing a sheet of paper into two equal segments is the print area. One of the scaled document images is laid out into each print area.

FIG. 26 (A) shows the entire area of a sheet of paper. The area of this sheet of paper is of a rectangular shape comprising the vertical side with a length of x (x being a constant) and the horizontal side with a length of $\sqrt{2}$x. The orientation of this paper is landscape. When the 2-in-1 printing is specified, two print areas, 2a and 2b, are produced by dividing the paper into two sections at the midpoint of the longer side. The areas 2a and 2b created by equally dividing the paper into two sections have the vertical side of a length x and the horizontal side $\sqrt{2}$x/2. The orientation of the print areas 2a and 2b is portrait.

FIG. 26 (B) shows the process of scaling down the document image in the portrait orientation and laying it out in the print area 2a. The document image has a length of $\sqrt{2}$x in the vertical direction and x in the horizontal direction. Therefore, the length of the longer side of the original document is $\sqrt{2}$x, which is the length in its vertical direction. Also, the length of the longer (i.e., vertical) side of the print area 2a is x. The ratio between the length of the longer side of the document image, $\sqrt{2}$x, and the length of the print area 2a parallel to the longer side of the document image, which is x, is calculated. A scale factor is then calculated based on the result of the calculation. In reality, the scale factor is calculated in such as way as to make the length of the longer side of the document image equal or smaller than the length of the print area 2a parallel to the longer side of the document image. From the standpoint of preventing the character font from becoming too small as much as possible, the scaling factor is calculated to make the length of longer side of the document image match with the length of the print area 2a parallel to the longer side of the document image. As a result, the scaling factor thus calculated is $1/\sqrt{2}$ (=about 0.707). The document image is scaled to about 0.707 times of its original size and laid out in the area $2a$ of the paper maintaining the original orientation of the document image.

FIG. 26 (C) shows the process of scaling down the document image in the landscape orientation. The document image has a length of x in the vertical direction and $\sqrt{2}x$ in the horizontal direction. Therefore, the length of the longer side of the document image is the length in the horizontal direction and is $\sqrt{2}x$. The length of the print area $2a$ in the direction parallel to the longer side of the document image (i.e., horizontal direction) is $\sqrt{2}x/2$. The ratio between the length of the longer side of the document image $\sqrt{2}x$ and the length of the print area $2a$ parallel to the longer side of the document image, i.e., $\sqrt{2}x/2$, is calculated. The scaling factor of this document image is calculated based on the resultant ratio. In reality, the scale factor is calculated in such as way as to make the length of the longer side of the document image equal or smaller than the length of the longer side of the print area $2a$. From the standpoint of preventing the character font from becoming too small as much as possible, the scaling factor is calculated to make the length of longer side of the document image match with the length of the print area $2a$ parallel to the longer side of the document image. As a result, the scaling factor thus calculated is ½ (=0.5). The document image is scaled to 0.5 times of its original size and laid out in the area $2a$ of the paper maintaining the original orientation of the document image.

FIG. 27 shows the process of this embodiment when the 4-in-1 printing is specified. If the 4-in-1 printing is specified, each area obtained by dividing a sheet of paper into four equal segments is the print area. A scaling factor is calculated for each document image.

FIG. 27 (A) shows the entire area of a sheet of paper. The area of this sheet of paper is of a rectangular shape comprising the vertical side with a length of x (x being a constant) and the horizontal side with a length of $\sqrt{2}x$. The orientation of this paper is landscape. When the 4-in-1 printing is specified, four print areas, $4a$, $4b$, $4c$ and $4d$, are produced by equally dividing the paper into four sections. The areas $4a$, $4b$, $4c$ and $4d$ created by equally dividing the paper into four sections have the vertical side of a length x/2 and the horizontal side $\sqrt{2}x/2$. The orientation of these print areas is landscape. One each of the scaled document images is laid out into each of these areas $4a$, $4b$, $4c$ and $4d$.

FIG. 27 (B) shows the process of scaling down the document image in the portrait orientation and laying it out in the print area $4a$. The document image has a length of $\sqrt{2}x$ in the vertical direction and x in the horizontal direction. Therefore, the length of the longer side of the document image is the length in the vertical direction, which is $\sqrt{2}x$. Also, the length of the print area $4a$ in the direction parallel to the longer side of the document image (i.e., vertical direction) is x/2. The ratio between the length of the longer side of the document image $\sqrt{2}x$ and the length of the print area $4a$ parallel to the longer side of the document image, i.e., x/2, is calculated. The scaling factor of this document image is calculated based on the resultant ratio. In reality, the scale factor is calculated in such as way as to make the length of the longer side of the document image equal or smaller than the length of the longer side of the print area $4a$. From the standpoint of preventing the character font from becoming too small as much as possible, the scaling factor is calculated to make the length of longer side of the document image match with the length of the print area $4a$ parallel to the longer side of the document image. As a result, the scaling factor thus calculated is $½\sqrt{2}$ (=about 0.353). The document image is scaled to 0.353 times of its original size and laid out in the area $4a$ of the paper maintaining the original orientation of the document image.

FIG. 27 (C) shows the process of scaling down the document image in the landscape orientation into the print area $4a$. The document image has a length of x in the vertical direction and $\sqrt{2}x$ in the horizontal direction. Therefore, the length of the longer side of the document image is the length in the horizontal direction and is $\sqrt{2}x$. The length of the print area $4a$ in the direction parallel to the longer side of the document image (i.e., horizontal direction) is $\sqrt{2}x/2$. The ratio between the length of the longer side of the document image $\sqrt{2}x$ and the length of the print area $4a$ parallel to the longer side of the document image, i.e., $\sqrt{2}x/2$, is calculated. The scaling factor of this document image is calculated based on the resultant ratio. In reality, the scale factor is calculated in such as way as to make the length of the longer side of the document image equal or smaller than the length of the longer side of the print area $4a$. From the standpoint of preventing the character font from becoming too small as much as possible, the scaling factor is calculated to make the length of longer side of the document image match with the length of the print area $4a$ parallel to the longer side of the document image. As a result, the scaling factor thus calculated is ½ (=0.5). The document image is scaled to 0.5 times of its original size and laid out in the area $4a$ of the paper maintaining the original orientation of the document image.

As described above, the system calculates the ratio between the length of the longer side of the document image and the length of the area on the paper, where the document image is laid out, in the direction parallel to the longer side of the document image. The document image is scaled based on the resultant ratio. This series of operation is repeated for each document image. As a result, even in case the N-in-1 printing is executed for multiple document images of various sizes, it is possible to prevent image losses and lay out the document images maintaining their original orientations. Therefore, the user can read the printed matters easily without having to rotate the printed matters.

Furthermore, in case the N-in-1 printing is specified and the paper to be printed, the print areas obtained by equally dividing them, and multiple document items are all rectangular shapes having a ratio of $\sqrt{2}:1$ between the longer side and the shorter side, the scaling factor for each document image can be calculated easily. Specifically, the scale factor for each document image can be calculated for the size and orientation of the paper, the size and orientation of the document image, and the number of document images to be laid out on a sheet of paper, i.e., the number of divisions N.

In case the N-in-1 printing is to be executed and print areas are to be set up by equally dividing a sheet of paper having a ratio of $\sqrt{2}:1$ between the longer side and the shorter side into N sections having similar shapes as the paper, a relation N=2 n (n being a positive integer), i.e., N=2, 4, 8, 16, . . . , must hold. The scaling process for N=2, 4, 8, 16, . . . , will be described below.

When N=2, in other words, in case of the 2-in-1 printing, the calculation process for the scaling factor is as follows. If the orientations of the document image and the paper are different, the document image is scaled in such a way that the area of the scaled document image becomes smaller than the size of the print area $2a$ obtained by dividing a sheet of paper as shown in FIG. 26 (B). On the other hand, if the orientations of the document image and the paper are equal, the document image is scaled in such a way that the area of the scaled document image becomes smaller than a half of the size of the print area 2a obtained by dividing a sheet of paper as shown in FIG. 26 (C).

Applying this process to the N-in-1 printing by generalizing it, the scaling factor can be calculated simply as follows.

In case the N-in-1 printing is to be executed where N is an odd number power of 2, the scaling factor can be calculated by means of the following process. If the orientation of the document image is different from the orientation of the paper, the scaling factor for the particular document image is calculated in such a way that the size of the scaled documentation image is smaller than the size of the print area obtained by equally dividing the paper into N subsections. On the other hand, if the orientation of the document image and the orientation of the paper are equal, the scaling factor is calculated in such a way that the size of the scaled documentation image is smaller than a half of the size of the print area.

In case the N-in-1 printing is to be executed where N is an even number power of 2, the scaling factor can be calculated by means of the following process. If the orientation of the document image is different from the orientation of the paper, the scaling factor for the particular document image is calculated in such a way that the size of the scaled documentation image is smaller than a half of the size of the print area obtained by equally dividing the paper into N subsections. On the other hand, if the orientation of the document image and the orientation of the paper are equal, the scaling factor is calculated in such a way that the size of the scaled documentation image is smaller than the size of the print area.

Examples of image layout processes will be described below referring to flowcharts where the processes are executed based on the size and orientation of the paper, the size and orientation of the document image, and the number of document images to be laid out on a sheet of paper.

Figure 28A:
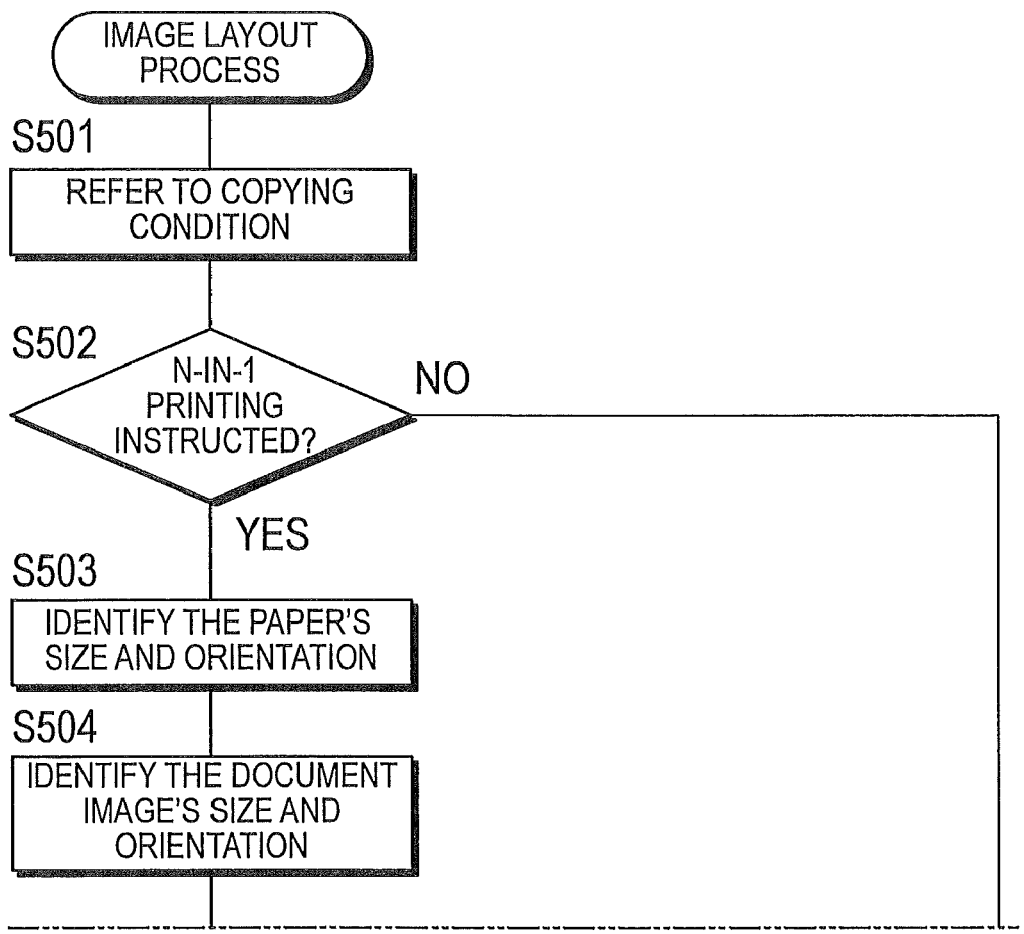

FIG. 28A and FIG. 28B show a flowchart of an image layout process according to the third embodiment of the invention. The image layout of this embodiment can be executed on the memory 106 similar to those for the first and second embodiments.

The CPU 109 refers to the copying condition stored on the control data memory part 16b (S501). As a result of the reference, a judgment is made whether the N-in-1 printing is to be executed (S502). If it is judged that the execution of the N-in-1 printing is not specified as a result of the reference (S502: NO), it goes to RETURN immediately. The print area is obtained by equally dividing the paper into N subsections, i.e., equal parts. The operating panel instructs the division number N. i.e., the number of the equal parts.

If the N-in-1 printing is specified (S502: YES), the data concerning the size and orientation of the paper stored in the control data memory part 16b as a part of the copying condition is referred to. As a result, the size and orientation of the paper is identified (S503). If the instruction for the paper size is not included in the copying condition, the size of the document image obtained by scanning it can be used as the size of the paper. Next, a document image is selected from the set of multiple document images. The size and orientation of the selected document image are detected by referring to the control data memory part 16b (S504).

A judgment is made, in FIG. 28B that follows, whether the number N (division number), which is the number of the document images to be laid out on a sheet of paper, is an odd number power of 2 (S505). For example, if the 2-in-1 printing, 8-in-1 printing, etc., are specified, it is judged that N is an odd number power of 2 (S505: YES). On the other hand, if the 4-in-1 printing, 16-in-1 printing, etc., are specified, it is judged that N is an even number power of 2 (S505: NO).

Next, the orientation of the paper is compared with the orientation of the document image to calculate the scaling factor for scaling the document images. If the number N of document images to be laid out on a sheet of paper is an odd number power of 2 (S505: YES), and the orientation of the paper is landscape, i.e., horizontal (S506: YES) while the orientation of the document image is portrait, i.e., vertical (S507: NO) or the orientation of the paper is portrait (S506: NO) while the orientation of the document image is landscape (S508: YES), the scaling factor is calculated in such a way as to make the size of the scaled document image be 1/N times of the size of the paper (S509). On the other hand, the orientations of both the paper and the document image are portrait (S506: YES and S507: YES), or the orientations of both the paper and the document image are landscape (S506: NO and S508: NO), the scaling factor is calculated in such a way as to make the size of the scaled document image be 1/2N times of the size of the paper (S510). In other words, if N is an odd number power of 2 and the orientation of the paper is different from the orientation of the document image, the scaling factor is calculated in such a way as to make the size of the scaled document image be equal to the size of an area obtained by equally dividing the paper into N segments, while if the orientation of the paper is the same as the orientation of the document image, the scaling factor is calculated in such a way as to make the size of the scaled document image be equal to a half the size of an area obtained by equally dividing the paper into N segments.

If the division number N is an even number power of 2 (S505: NO), and if the orientations of both the paper and the document image are landscape (S511: YES and S508: YES), or the orientations of both the paper and the document image are portrait (S511: NO and S507: NO), the scaling factor is calculated in such a way as to make the size of the scaled document image be 1/N times of the size of the paper (S509). On the other hand, the orientation of the paper is landscape (S511: YES) while the orientation of the document image is portrait (S508: NO) or the orientation of the paper is portrait (S511: NO) while the orientation of the document image is landscape (S507: YES), the scaling factor is calculated in such a way as to make the size of the scaled document image be 1/2N times of the size of the paper (S510). In other words, if N is an even number power of 2 and the orientation of the paper is the same as the orientation of the document image, the scaling factor is calculated in such a way as to make the size of the scaled document image be equal to the size of an area obtained by equally dividing the paper into N segments, while if the orientation of the paper is different from the orientation of the document image, the scaling factor is calculated in such a way as to make the size of the scaled document image be equal to a half the size of an area obtained by equally dividing the paper into N segments.

As described above, the document image is scaled based on the calculated scaling factor (S512). One each of the scaled document images is laid out in each print area (S513).

It is preferable that each scaled document image is printed in the middle of each print area. More specifically, it is possible to lay out the scaled document image to cause the center of the scaled document image to align with the center of the area of the paper. As a result, the eccentric positioning of the scaled document image can be prevented and the document image is located in a neat and easily viewable fashion.

When it is judged that all document images are laid out (S514: YES), other image processes such as, spacing, will be done (S515). This concludes the document layout process.

Figure 30:
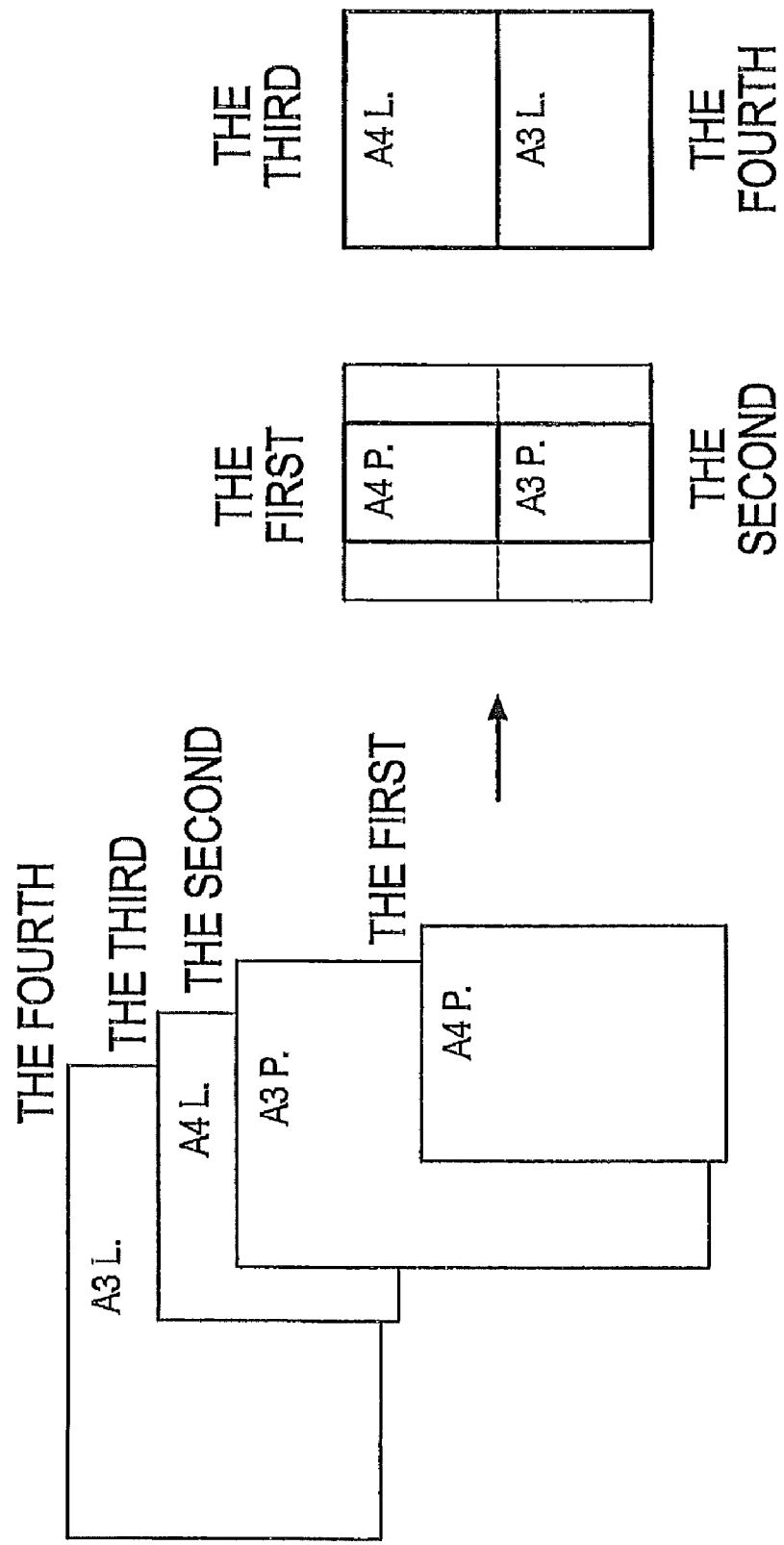
FIG. 30 is a drawing showing another example of image layout based on the process shown in FIG. 28A and FIG. 28B.
Figure 31:
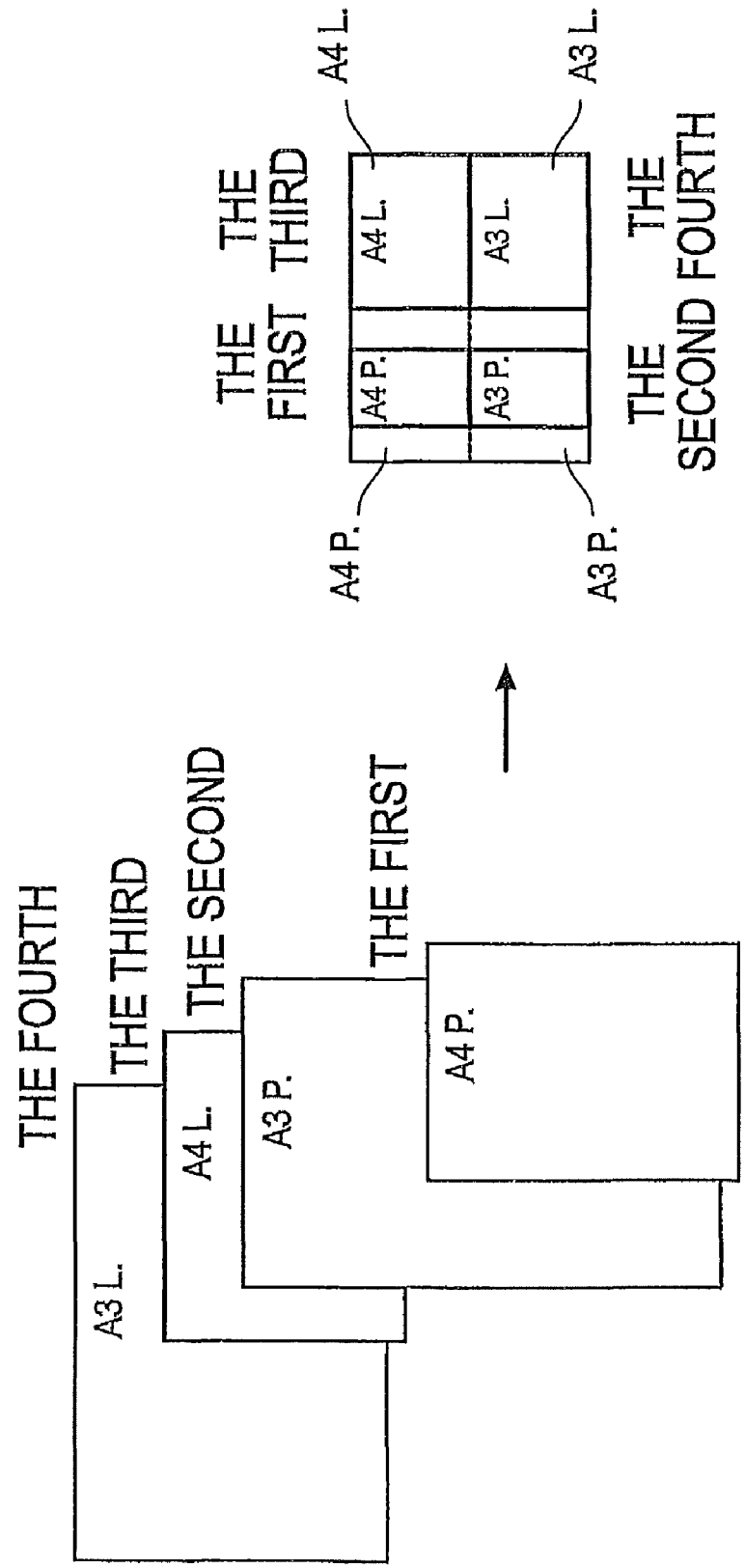
FIG. 31 is a drawing showing yet another example of image layout based on the process shown in FIG. 28A and FIG. 28B.

FIG. 29, FIG. 30 and FIG. 31 show the example layouts based on the process shown in FIG. 28A and FIG. 28B. FIG.

29 shows the process of laying out document images on A4 size, landscape position paper. The document images shown on FIG. 29 consist of the first document image of the A4 size in the portrait orientation, the second document image of the A3 size in the portrait orientation, the third document image of the A4 size in the landscape orientation, and the fourth document image of the A3 size in the landscape orientation.

FIG. 29 describes an image layout case where the 2-in-1 printing is executed. Therefore, the number N of the document images laid out on a single sheet of paper is 2 and N is an odd number power of 2. The size of the print area is A5 as the area obtained by equally dividing the paper into two sections.

The orientation of the first document image is portrait and is different from the orientation of the paper. Therefore, the scaling factor is calculated to be 0.707 to make the size of the first document image, which is A4, be equal to the size of the print area. The first document is scaled according to this calculated scaling factor. The reduced first document image is laid out in the left side print area of the first sheet of paper maintaining the original orientation. The orientation of the second document is portrait and is different from the orientation of the paper. Therefore, the scaling factor is calculated to be 0.5 to make the size of the first document image, which is A3, be equal to the size of the print area. The second document is scaled according to this calculated scaling factor, 0.5. The reduced second document image is laid out in the right side print area of the first sheet of paper maintaining the original orientation. Thus, the first and second document images can be laid out without losing any portion of the images and maintaining their original orientations.

Similarly, the orientation of the third document image is landscape and coincides with the orientation of the paper. Therefore, the scaling factor is calculated to be 0.5 to make the size of the third document image, which is A4, be equal to a half the size of the print area, i.e., A6. The third document is scaled according to this calculated scaling factor, 0.5. The reduced third document image is laid out in the left side print area of the second sheet of paper maintaining the original orientation. The orientation of the fourth document image is landscape and coincides with the orientation of the paper. Therefore, the scaling factor is calculated to be 0.353 to make the size of the fourth document image, which is A3, be equal to a half the size of the print area, i.e., A6. The fourth document is scaled according to this calculated scaling factor, 0.353. The reduced fourth document image is laid out in the right side print area of the second sheet of paper maintaining the original orientation. These reduced document images are laid out in such a way that the centers of the reduced document images align with the centers of the areas where they are laid out.

FIG. 30 shows the process of laying out document images on A4 size, landscape position paper. The document images shown on FIG. 30 consist of the first document image of the A4 size in the portrait orientation, the second document image of the A3 size in the portrait orientation, the third document image of the A4 size in the landscape orientation, and the fourth document image of the A3 size in the landscape orientation. FIG. 30 describes an image layout case where the 2-in-1 printing is executed. Therefore, the number N of the document images laid out on a single sheet of paper is 2 and N is an odd number power of 2. The size of the print area is A5 as the area obtained by equally dividing the paper into two sections.

The orientation of the first document image is portrait and coincides with the orientation of the paper. Therefore, the scaling factor is calculated to be 0.5 to make the size of the first document image, which is A4, be equal to a half the size of the print area. The first document is scaled according to this calculated scaling factor. The reduced first document image is laid out in the upper half of the print area of the first sheet of paper maintaining the original orientation. The orientation of the second document is portrait and coincides with the orientation of the paper. Therefore, the scaling factor is calculated to be 0.353 to make the size of the second document image, which is A3, be equal to a half the size of the print area. The second document is reduced according to this calculated scaling factor. The reduced second document image is laid out in the bottom half of the print area of the first sheet of paper maintaining the original orientation. The orientation of the third document image is landscape and is different from the orientation of the paper. Therefore, the scaling factor is calculated to be 0.707 to make the size of the third document image, which is A4, be equal to the size of the print area. The third document is reduced according to this calculated scaling factor. The reduced third document image is laid out in the upper half of the print area of the second sheet of paper maintaining the original orientation. The orientation of the fourth document image is landscape and is different from the orientation of the paper. Therefore, the scaling factor is calculated to be 0.707 to make the size of the fourth document image, which is A3, be equal to the size of the print area. The fourth document is reduced according to this calculated scaling factor, 0.707. The reduced fourth document image is laid out in the bottom half of the print area of the second sheet of paper maintaining the original orientation.

FIG. 31 shows the process of laying out document images on A4 size, landscape position paper. The document images shown on FIG. 31 consist of the first document image of the A4 size in the portrait orientation, the second document image of the A3 size in the portrait orientation, the third document image of the A4 size in the landscape orientation, and the fourth document image of the A3 size in the landscape orientation. Therefore, the number N of the document images laid out on a single sheet of paper is 4 and N is an even number power of 2. The size of the print area is A6 as the area obtained by equally dividing the paper into two sections.

The orientation of the first document image is portrait and is different from the orientation of the paper. Therefore, the scaling factor is calculated to be 0.353 to make the size of the first document image, which is A4, be equal to a half the size of the print area, i.e., A7. The first document is scaled according to this calculated scaling factor. The reduced first document image is laid out in the left upper corner of the print area of the first sheet of paper maintaining the original orientation. The orientation of the second document is portrait and is different from the orientation of the paper. Therefore, the scaling factor is calculated to be 0.25 to make the size of the second document image, which is A3, be equal to a half the size of the print area, i.e., A7. The second document is reduced according to this calculated scaling factor. The reduced second document image is laid out in the bottom left corner of the print area of the first sheet of paper maintaining the original orientation. The orientation of the third document image is landscape and coincides with the orientation of the paper. Therefore, the scaling factor is calculated to be 0.5 to make the size of the third document image, which is A4, be equal to the size of the print area, i.e., A6. The third document is reduced according to this calculated scaling factor. The reduced third document image is laid out in the upper right corner of the print area of the second sheet of paper maintaining the original orientation. The orientation of the fourth document image is landscape and coincides with the orientation of the paper. Therefore, the scaling factor is calculated to be 0.353 to make the size of the fourth document image, which is A3, be equal to the size of the print area, i.e., A6. The fourth document is reduced according to this calculated scaling factor. The reduced fourth document image is laid out in the bottom right corner of the print area of the second sheet of paper maintaining the original orientation. Thus, the first, second, third and fourth document images are synthesized to form a new output document data.

As seen in the above, the embodiment provides a means of image processing where multiple document images are laid out maintaining their original orientations, making it easier to view them. It also prevents multiple document images of various sizes from losing any part thereof even when they are being processed for the N-in-1 printing.

Furthermore, as indicated in a flowchart of FIG. 28, the scaling factor can be easily calculated by means of considering those points as whether the number N of documents that are laid out on a sheet of paper is an odd number power of 2 and whether the orientation of the paper coincide with the orientation of the document image.

A similar image process can be executed when the digital copying is used as a printer. This is the same as in the first and second embodiments. The image layout process can be executed on any of the printer drivers of the clients 30a through 30d, the print server 30, or the digital copying machine 100. Since the processes in this case are similar to those described using the FIGS. 16A, 16B, 17, and 18 of the first embodiment, detailed descriptions are not repeated here. FIG. 32 shows an example of the printer driver's display screen in the third embodiment of the invention.

As described in the above, the image processing according to this embodiment provides a means of detecting the size of each document image, calculating the scaling factor in order to match the size of each detected document image with the size of a print area obtained by equally dividing the paper, and scaling the size of each document image based on each calculated scaling factor. Therefore, it is capable of preventing multiple document images of various sizes from losing any part thereof even when they are being processed for the N-in-1 printing. It is also capable of printing out those document images maintaining their original orientations. Therefore, the user can read the printed matters without rotating them.

Although the first, second and third embodiments were described in the above using as an example a network image forming system, which is a compound machine with copying and printing capabilities comprising the digital copying machine 100 and the print server 20, the invention is not to be construed to be limited by such a structure. The present invention is equally applicable to a digital copying machine which is a dedicated copying machine, a printer which is a dedicated printing machine, a digital facsimile machine, or a print server.

It is possible to start actual printing on paper after preparing the output image data for all pages, or, alternatively, prepare the output image data for the succeeding pages while printing based on the output image data for pages for which image layouts have been completed.

The process according to the present invention can be performed by executing the procedure shown in FIGS. 10, 12, 19, 21, 24, 26, 28 and 31 by means of the CPU 109, 21 and 31. It is also possible to provide these specific programs by computer readable means (e.g., floppy disk, CD ROM, etc.).

These programs can be provided as application software for executing the process or being built into the digital copying machine 100 or the print server 20 as a function. Such a program can also be built into printer drivers installed on the clients 30a through 30d. The computer program product includes a program itself, a memory medium that stores the program, and an apparatus where the program is installed to operate it.

What is claimed is:

1. An image forming apparatus comprising:
    a receiving unit for receiving an individual print job from an external device, the print job comprising print data representing images of multiple pages of various sizes;
    a detecting unit for detecting a maximum size of the multiple pages;
    a selecting unit for selecting a paper size that is equal to or larger than the detected maximum size; and
    a forming unit for forming all of the images represented by the individual print job on papers of the selected paper size.

2. An image forming apparatus comprising:
    a receiving unit for receiving an individual print job from an external device, the print job comprising print data representing images of multiple pages of various sizes;
    a detecting unit for detecting a maximum size of the multiple pages;
    a calculating unit for calculating magnification ratio on the basis of the detected maximum size and a paper size of papers on which the images of the multiple pages are to be reproduced;
    a processing unit for processing the print data of each of the images based on the magnification ratio calculated by the calculating unit; and
    an image forming unit that forms magnified images, on the basis of the processed image data on the papers of the size.

3. The image forming apparatus of claim 1, wherein the detecting unit detects the maximum size by searching document sizes of the multiple pages.

4. The image forming apparatus of claim 2, wherein the detecting unit detects the maximum size by searching document sizes of the multiple pages.

5. The image forming apparatus of claim 1, wherein the image forming apparatus further includes a document feeder, and the detecting unit comprises a sensor provided in the document feeder.

6. The image forming apparatus of claim 2, wherein the image forming apparatus further includes a document feeder, and the detecting unit comprises a sensor provided in the document feeder.

7. The image forming apparatus of claim 1, wherein the image forming apparatus further includes an image reader, and the detecting unit is capable of sensing the maximum size before all of the images of the multiple pages are read by the image reader.

8. The image forming apparatus of claim 2, wherein the image forming apparatus further includes an image reader, and the detecting unit is capable of sensing the maximum size before all of the images of the multiple pages are read by the image reader.

* * * * *